United States Patent
Simpson

(10) Patent No.: US 11,884,442 B2
(45) Date of Patent: Jan. 30, 2024

(54) SYSTEM AND METHOD FOR BUILDING MACHINE LEARNING OR DEEP LEARNING DATA SETS FOR RECOGNIZING LABELS ON ITEMS

(71) Applicant: United States Postal Service, Washington, DC (US)

(72) Inventor: Ryan J. Simpson, Vienna, VA (US)

(73) Assignee: United States Postal Service, Washington, DC (US)

(*) Notice: Subject to any disclaimer, the term of this patent is extended or adjusted under 35 U.S.C. 154(b) by 505 days.

(21) Appl. No.: 17/191,483

(22) Filed: Mar. 3, 2021

(65) Prior Publication Data

US 2021/0280091 A1 Sep. 9, 2021

Related U.S. Application Data

(60) Provisional application No. 62/985,234, filed on Mar. 4, 2020.

(51) Int. Cl.

| | |
|---|---|
| *B65C 1/02* | (2006.01) |
| *G09F 3/02* | (2006.01) |
| *G06N 20/00* | (2019.01) |
| *G06Q 50/26* | (2012.01) |
| *G06K 7/00* | (2006.01) |

(52) U.S. Cl.
CPC ............ *B65C 1/02* (2013.01); *G06K 7/00* (2013.01); *G06N 20/00* (2019.01); *G06Q 50/26* (2013.01); *G09F 3/0288* (2013.01)

(58) Field of Classification Search
CPC . B65C 1/02; G06N 20/00; G06K 7/00; G06Q 50/26; G09F 3/0288
See application file for complete search history.

(56) References Cited

U.S. PATENT DOCUMENTS 10,360,531 B1 * 7/2019 Stallman .............. G06Q 10/087

OTHER PUBLICATIONS

Chen, "A Remote Controlled Robotic Arm That Reads Barcodes and Handles Products", MDPI 2018 (Year: 2018).*

* cited by examiner

*Primary Examiner* — Mark Roz
(74) *Attorney, Agent, or Firm* — Knobbe Martens Olson & Bear LLP

(57) ABSTRACT

This application relates to a method and a system for building machine learning or deep learning data sets for automatically recognizing labels on items. The system may include an optical scanner configured to capture an item including one or more labels provided thereon, the item captured a plurality of times at different positions with respect to the optical scanner. The system may further include a robotic arm on which the item is disposed, the robotic arm configured to rotate the item horizontally and/or vertically such that the one or more labels of the item are captured by the optical scanner at different positions with respect to the optical scanner. The system may include a database configured to store the captured images.

19 Claims, 15 Drawing Sheets

SYSTEM AND METHOD FOR BUILDING MACHINE LEARNING OR DEEP LEARNING DATA SETS FOR RECOGNIZING LABELS ON ITEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to and the benefit of Provisional Application No. 62/985,234 filed on Mar. 4, 2020 in the U.S. Patent and Trademark Office, the entire contents of which are incorporated herein by reference.

BACKGROUND

Technical Field

The described technology generally relates to image processing, and in particular to a system and method for building machine learning or deep learning data sets, for training a machine learning or deep learning model with the built data sets, or for automatically recognizing labels on items using the trained model.

Description of the Related Technology

Handling items through processing systems typically includes capturing one or more images of the item as it is being processed. For example, items, such as articles of mail (e.g., letters, flats, parcels, and the like), warehouse inventories, or packages are frequently received into a processing facility in bulk, and must be sorted into particular groups to facilitate further processes such as, for example, delivery of the item to a specified destination. Sorting items or articles can be done using imaging technologies. The ability to accurately process a given item may be limited by the effectiveness of the imaging technology to extract accurate information about each item. The information may include personal information about the sender or receiver of the item such as name, address, account information, or other item information such as warning labels, hazardous labels, class identifiers, service classes, etc., or other information that is provided in trust that public disclosure will be limited if not avoided altogether. The captured image may go through image processing including, but not limited to, feature detection from the captured image.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for building machine learning or deep learning data sets, for training a machine learning or deep learning model with the built data sets, or for automatically recognizing labels on items using the trained model.

One aspect is a system for building machine learning or deep learning data sets for automatically recognizing information on items, the system comprising: an optical scanner configured to capture an item including one or more pieces of information provided thereon, the item captured a plurality of times at different positions with respect to the optical scanner, a robotic arm on which the item is disposed, the robotic arm configured to rotate the item horizontally and/or vertically such that the one or more pieces of the information of the item are captured by the optical sensor at the different positions with respect to the optical scanner, and a database configured to store the captured images of the one or more pieces of information of the item.

In the above system, the item comprises a mail item, and wherein the one or more pieces of the information comprise an address section, a sender section, a recipient section, a barcode section, a postage section, a special item section and a label. In the above system, the label comprises a service class indicator label, a warning label or a hazardous label. In the above system, the hazardous label comprises a department of transportation (DOT) hazard class label.

Another aspect is a system for building machine learning or deep learning data sets for automatically recognizing labels on items, the system comprising: an optical scanner configured to capture an item including one or more labels provided thereon, the item captured a plurality of times at different positions with respect to the optical scanner; a robotic arm on which the item is disposed, the robotic arm configured to rotate the item horizontally and/or vertically such that the one or more labels of the item are captured by the optical scanner at the different positions with respect to the optical scanner, and a database configured to store the captured images of the one or more labels of the item.

In the above system, the database is further configured to store relationships between the different positions of the labels and whether the captured labels are recognized by the optical scanner, and wherein the system further comprises a controller in data communication with the optical scanner, the robotic arm and the database, the controller configured to control the optical scanner and the robotic arm such that the optical scanner captures the item at each of the different positions, the controller further configured to determine the relationships.

In the above system, the controller is further configured to move at least one of the optical scanner and the robotic arm to at least partially align a lens of the optical scanner with the item disposed on the robotic arm. The above system further comprises a light source configured to emit light to the one or more labels of the item. In the above system, the controller is further configured to control one or more of the optical scanner, the robotic arm and the light source such that the one or more labels of the item are captured by the optical scanner in different capturing environments. In the above system, the different capturing environments comprise one or more of robotic arm or item movement speeds, optical scanner shutter speeds, focus, intensity, color, white balance, lightings, shadows, contrasts, lighting conditions, or combinations thereof.

In the above system, the positions comprise one or more of angles or distances between a lens of the optical scanner and the item, or orientations of the item with respect to the lens of the optical scanner. The system further comprises: a plate to which the item is attached; and rotation mechanism provided on the robotic arm and configured to rotate the plate. In the above system, the labels comprise service class indicator labels, warning labels or department of transportation (DOT) hazard class labels.

Another aspect is a system for automatically recognizing labels on items, the system comprising: an optical scanner configured to capture a plurality of items at least one of which includes a label provided thereon so as to generate an image; a memory configured to store a machine learning or deep learning model for recognizing labels regardless of whether the labels are captured at different positions and/or different capturing environments; and a processor in data communication with the optical scanner and the memory and configured to run the machine learning or deep learning model on the generated image to identify an item having the label.

In the above system, the processor is configured to process the identified item based on the type of label included in the generated image. In the above system, the processor is configured to control the memory to store a status of the identified item to be consistent with the label. In the above system, the label comprises a warning label, a department of transportation (DOT) hazard class label or a service classification indicator label.

Another aspect is a system for building machine learning or deep learning data sets for automatically recognizing labels, the system comprising: an optical scanner configured to capture a label a plurality of times at different positions with respect to the optical scanner; a robotic arm on which the label is disposed, the robotic arm configured to rotate the label horizontally and/or vertically such that the label is captured by the optical scanner at the different positions with respect to the optical scanner; and a database configured to store the captured images of the label and relationships between the different positions of the label and whether the captured images of the label are fully recognized by the optical scanner.

The above system further comprises a controller in data communication with the optical scanner, the robotic arm and the database, and configured to control the optical scanner and the robotic arm such that the optical scanner captures the label at each of the different positions, the controller further configured to determine the relationships between the different positions of the label and whether the captured images of the label are fully recognized by the optical scanner. In the above system, the controller is further configured to move at least one of the optical scanner and the robotic arm to at least partially align a lens of the optical scanner with the label disposed on the robotic arm.

The above system further comprises a light source configured to emit light to the label at the different positions. In the above system, the controller is further configured to control one or more of the optical scanner, the robotic arm and the light source such that the label is captured by the optical scanner in different capturing environments. In the above system, the different capturing environments comprise robotic arm or item movement speeds, optical scanner shutter speeds, focus, intensity, color, white balance, lightings, shadows, contrasts, lighting conditions, or combinations thereof.

In the above system, the positions comprise one or more of angles or distances between a lens of the optical scanner and the label, or orientations of the label with respect to the lens of the optical scanner. In the above system, the label comprises a warning label, a department of transportation (DOT) hazard class label or a service classification indicator label.

Another aspect is a method of building machine learning or deep learning data sets for automatically recognizing information on items, the method comprising: capturing, at an optical scanner, an item including one or more pieces of information provided thereon, the item captured a plurality of times at different positions with respect to the optical scanner; rotating the item, via a robotic arm on which the item is disposed, horizontally and/or vertically such that the one or more pieces of the information of the item are captured by the optical scanner at the different positions with respect to the optical scanner; and storing, at a database, the captured images of the one or more pieces of information of the item.

In the above method, the storing comprises storing relationships between the different positions of the one or more pieces of the information of the item and whether the captured one or more pieces of the information of the item are fully recognized by the optical scanner. In the above method, the item comprises a mail item, and wherein the one or more pieces of the information comprise an address section, a sender section, a recipient section, a barcode section, a postage section, a special item section, and a label. In the above method, the label comprises a warning label, a department of transportation (DOT) hazard class label or a service classification indicator label.

Another aspect is a method of building machine learning or deep learning data sets for automatically recognizing labels on items, the system comprising: capturing, at an optical scanner, an item including one or more labels provided thereon, the item captured a plurality of times at different positions with respect to the optical scanner; rotating the item, via a robotic arm on which the item is disposed, horizontally and/or vertically such that the one or more labels of the item are captured by the optical scanner at the different positions with respect to the optical scanner, and storing, at a database, the captured images of the one or more labels of the item.

The above method further comprises controlling, at a controller, the database to move a first portion of the captured images stored in the database to a training data DB and a second portion of the captured images stored in the database different from the first portion to a test data DB, the controller configured to train a machine learning or deep learning model for automatically recognizing labels on items with the first portion of the captured images, and test the trained machine learning or deep learning model with the second portion of the captured images.

In the above method, the controlling comprises moving at least one of the optical scanner and the robotic arm to at least partially align a lens of the optical scanner with the item disposed on the robotic arm. The above method further comprises emitting, at a light source, light to the one or more labels of the item. The above method further comprises controlling, at the controller, one or more of the optical scanner, the robotic arm and the light source such that the one or more labels of the item are captured by the optical scanner in different capturing environments.

In the above method, the different capturing environments comprise robotic arm or item movement speeds, optical scanner shutter speeds, focus, intensity, color, white balance, lightings, shadows, contrasts, lighting conditions or combinations thereof. In the above method, the positions comprise one or more of angles or distances between a lens of the optical scanner and the label, orientations of the label with respect to the lens of the optical scanner. In the above method, the labels comprise warning labels, department of transportation (DOT) hazard class labels or service classification indicator labels.

Another aspect is a method of building machine learning or deep learning data sets for automatically recognizing labels, the method comprising: capturing, at an optical scanner, a label a plurality of times at different positions with respect to the optical scanner, rotating the label, via a robotic arm on which the label is disposed, horizontally and/or vertically such that the label is captured by the optical scanner at the different positions with respect to the optical scanner; and storing, at a database, the captured images of the label.

The above method further comprises controlling, at a controller, the database to move a first portion of the captured images stored in the database to a training data DB and a second portion of the captured images stored in the database different from the first portion to a test data DB, the controller configured to train a machine learning or deep learning model for automatically recognizing labels on items with the first portion of the captured images, and test the trained machine learning or deep learning model with the second portion of the captured images.

In the above method, the controlling comprises moving at least one of the optical scanner and the robotic arm to at least partially align a lens of the optical scanner with the label disposed on the robotic arm. The above method further comprises emitting, at a light source, light to the label. In the above method, the controlling comprises controlling, at the controller, one or more of the optical scanner, the robotic arm and the light source such that the label is captured by the optical scanner in different capturing environments. In the above method, the different capturing environments comprise one or more of robotic arm or item movement speeds, optical scanner shutter speeds, focus, intensity, color, white balance, lightings, shadows, contrasts, lighting conditions, or combinations thereof.

In the above method, the positions comprise one or more of angles or distances between a lens of the optical scanner and the label, orientations of the label with respect to the lens of the optical scanner. In the above method, the label comprises a warning label, a department of transportation (DOT) hazard class label or a service classification indicator label. In the above method, the DOT hazard class label comprise labels containing information relating to flammable liquid or radioactive material.

Another aspect is a method of automatically recognizing labels on items, the method comprising: capturing, at an optical scanner, a plurality of items at least one of which includes a label provided thereon so as to generate an image; storing, at a memory, a machine learning or deep learning model for recognizing labels regardless of whether the labels are captured at different positions and/or different capturing environments; and running, at a processor, the machine learning or deep learning model on the generated image to identify an item having the label.

In the above method, the capturing is performed, at the optical scanner, on the plurality of items which are at least partially stacked on each other. In the above method, the running comprises processing the identified item based on the type of label included in the image. In the above method, the running comprises controlling the memory to store a status of the identified item to be consistent with the label. In the above method, the label comprises a warning label, a department of transportation (DOT) hazard class label or a service classification indicator label.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1B:
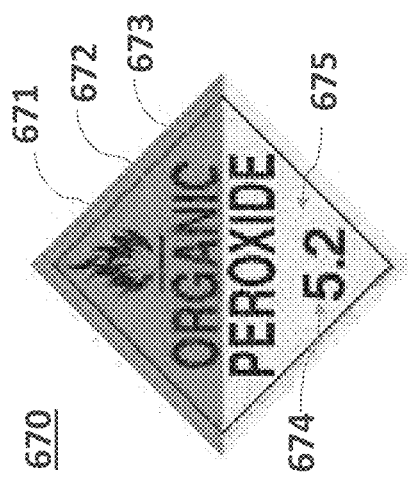
FIGS. 1A-1D illustrate example labels that can be provided on an item according to some embodiments.

Provided herein are various embodiments of systems and methods for image processing including, for example, a system and method for building data sets for training a machine learning or deep learning model to be used for automatically recognizing labels on mail or parcel items. Also provided herein are various embodiments of systems and methods for training a machine learning or deep learning model for automatically recognizing labels on items with the built data sets. Also provided herein are various embodiments of systems and methods for automatically recognizing labels on items using the trained model. Various embodiments can allow for fully recognizing labels on items regardless of whether the labels were captured at different positions and/or different capturing environments so that the functionality of computing devices is significantly improved.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used here, the term "item" or "items" may refer to flats, letters, parcels, residual mail, and the like. Although the present disclosure describes systems and devices for image processing related to articles of mail, such as letters and flats, it will be apparent to one of skill in the art that the disclosure presented herein is not limited thereto. For example, the described technology may have application in a variety of manufacturing, assembly, distribution, or sorting applications which include processing images including personal or sensitive information at high rates of speed and volume.

As used here, the term "compress" or "compression" generally refers to generating a data file that takes a smaller quantity of memory than an original, uncompressed data file. Compressing image files retains at least a portion of the visual information of the original image data. As such, with an appropriate viewing application, a user may open a compressed file to view the image data. The resource may include one or more of: memory, network bandwidth, network packets, memory blocks, processor cycles, time to write to memory (e.g., disk), time to read from memory, or the like. Compression may include generating a compressed file from an uncompressed file by reducing the number of bits needed to represent the same information. In some embodiments, compression may include losing some clarity from the original image, such as image resolution or color range, to achieve the resource savings. Such compressions may be referred to as lossy compression. Compression with no clarity loss may be referred to as lossless compression. As used here, the term "decompress" or "decompression" generally refers to reversing the compression process to reconstruct a file to present the original file information. As discussed, the reconstruction may not be an identical reconstruction of the original file as some compression schemes are lossy.

Where a plurality of images are captured, large volumes of data are created. This can be the case in various applications, such as recording video, photographing items, such as archives, and other applications where multiple images are being captured. A large amount of data is generated when handling items through processing systems. Handling items can include capturing one or more images of the item as it is being processed. For example, items, such as articles of mail (e.g., letters, flats, parcels, and the like), warehouse inventories, or packages are frequently received into a processing facility in bulk, and must be sorted into particular groups to facilitate further processes such as, for example, delivery of the item to a specified destination. Sorting items or articles can be done using imaging technologies. The ability to accurately process a given item may be limited by the effectiveness of the imaging technology to extract accurate information about each item. The information may include personal information about the sender or receiver of the item such as name, address, account information, or other information that is provided in trust that public disclosure will be limited if not avoided altogether. Careful handling of the personal information includes careful handling of images taken of the item during processing. Mail delivery is one example of an industrial application that relies on sorting and processing large quantities of items. Others may include, but are not limited to, retail operations with large inventories and high daily sales, high volume component manufacturers, such as consumer goods, baggage sorting, and importing operations with high volumes of imports needing sorting and receiving daily.

Distribution items such as letters, flats, parcels, containers, inventory, pallets, rolling stock, etc. are scanned, imaged, processed, and/or sorted in item processing equipment, and the information (e.g., addresses, types of items, barcode, etc.) from the items are read, interpreted, stored, and used in processing items. Thus, hereinafter, a description about the item processing facility will be provided first. A processing facility can use automated processing equipment to sort items. An item processing facility may receive a very high volume of items, such as letters, flats, parcels, or other objects which must be sorted and/or sequenced for delivery. Sorting and/or sequencing may be accomplished using item processing equipment which can scan, read, or otherwise interpret a destination end point from each item processed. The destination end point may be encoded in a computer readable code, such as a bar code printed on or affixed to an exterior surface of the item. In some embodiments, the destination end point may be read by taking an image of the item and performing an optical character recognition (OCR) process on the image, and determining the delivery end point from the OCR'd address. In some embodiments, the item processing equipment can apply a computer readable code that encodes the delivery end point and may print or spray the computer readable code onto the item. In some embodiments, the processing facility uses sorting/sequencing apparatuses which can process over about 30,000 items per hour.

Some embodiments provide an improved image processing system and method by building machine learning or deep learning data sets for automatically recognizing labels on items, including, for example, parcels or other mail items.

Some embodiments provide an improved image processing system and method by automatically recognizing labels on items, for example, mail or parcel items located in a warehouse, on a dock, on a pallet, in a stack, in a container, or in other location. By imaging the items and using machine learning to interpret the images reduces or eliminates the need for manual sorting, manual identification of items, etc. The machine learning can identify labels on items and provide alerts or cause sorting or processing equipment to process the item in accordance with directions based on the identified label. In this way, it is possible to allow for fully recognizing labels on items regardless of whether the labels were captured at different positions and/or different capturing environments or orientations relative to an imaging device, so that the functionality of computing devices is significantly improved. The image processing and compression systems and methods of the present disclosure can have applicability in a variety of applications other than item processing. For example, the systems and methods described herein can also be used in video applications, such as recognizing video images in a video file or video streaming, and the like. In some embodiments, an optical scanner or reader may read labels when items are in a stockpile, a truck, etc. The labels may include warning labels, hazardous labels, service class indicators, and the like. These labels may be placed on items such as boxes, letters, flats, parcels, etc.

FIGS. 1A-1D illustrate example labels 665, 670, 680 and 690 that can be provided on items according to some embodiments. The labels 665, 670, 680 and 690 may include, for example, department of transportation (DOT) hazardous labels. The DOT hazardous labels may be designed in compliance with nine hazardous classes including hazardous classes 1-9 covering explosive, flammable, oxidizer, poison, radioactive, corrosive, other dangerous materials or products, etc. Each class may include one or more sub-classes. The labels 665, 670, 680 and 690 are merely example labels and other labels having different shapes, layouts, designs, colors, text or a combination thereof are also possible. Embodiments of the present disclosure can also apply to recognition and identification of other types of labels (not just hazardous labels) as well, including shipping labels, address labels, item class labels or markings, such as priority mail, or any other type of desired label or marking on an item.

Figure 1D:
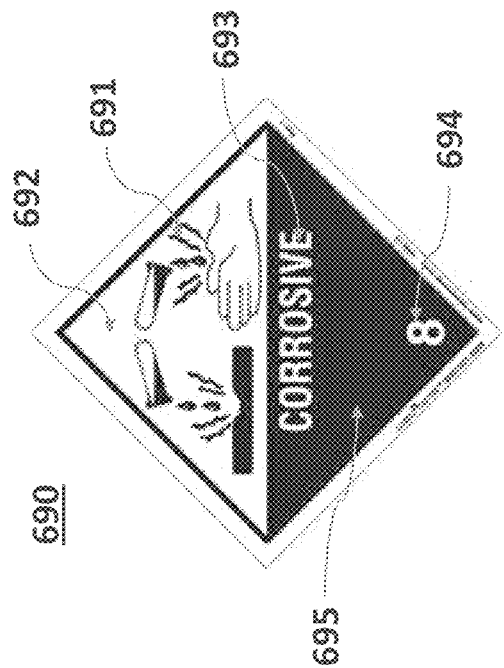
Figure 1A:
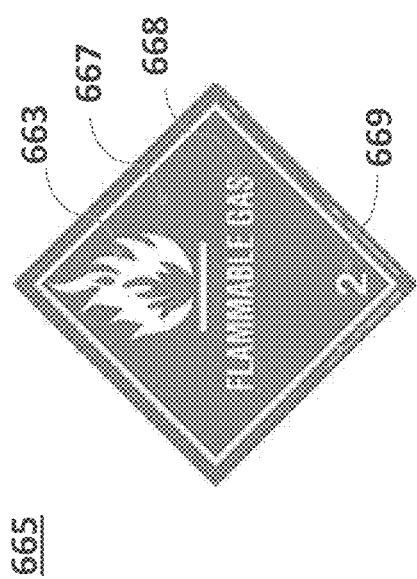

FIG. 1A shows a DOT class 2 hazardous label 665. The label 665 may include a symbol portion 663, a background portion 667, a text portion 668 and a hazard class number portion 669. The symbol portion 663 may have a flame shape. The background section 667 may have a specific color, for example, red. The text portion 668 may indicate a "flammable gas." The hazard class number portion 669 may include a class number relating to flammable gas (e.g., class 2).

FIG. 1B shows a DOT class 5.2 hazardous label 670. The label 670 may include a symbol portion 671, an upper background portion 672, a text portion 673, a hazard class number portion 674 and a lower background portion 675. The text portion 673 may indicate an "organic peroxide," or another compound or chemical or composition. The hazard class number portion 674 may include a class number relating to organic peroxide (e.g., class 5.2).

Figure 1C:
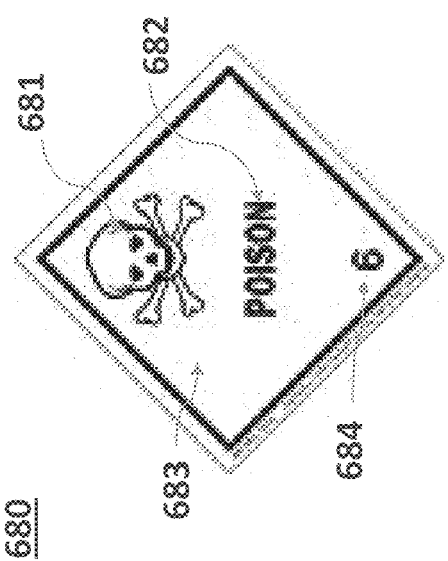

FIG. 1C shows a DOT class 6 hazardous label 680. The label 680 may include a symbol portion 681, a text portion 682, a background portion 683, a hazard class number portion 684. The text portion 682 may indicate "poison."
The hazard class number portion 684 may include a class number relating to a poisonous material (e.g., class 6).

FIG. 1D shows a DOT class 8 hazardous label 690. The label 690 may include a symbol portion 691, an upper background portion 692, a text portion 693, a hazard class number portion 694 and a lower background portion 695. The text portion 693 may indicate "corrosive." The hazard class number portion 694 may include a class number relating to a corrosive material (e.g., class 8).

Figure 2:
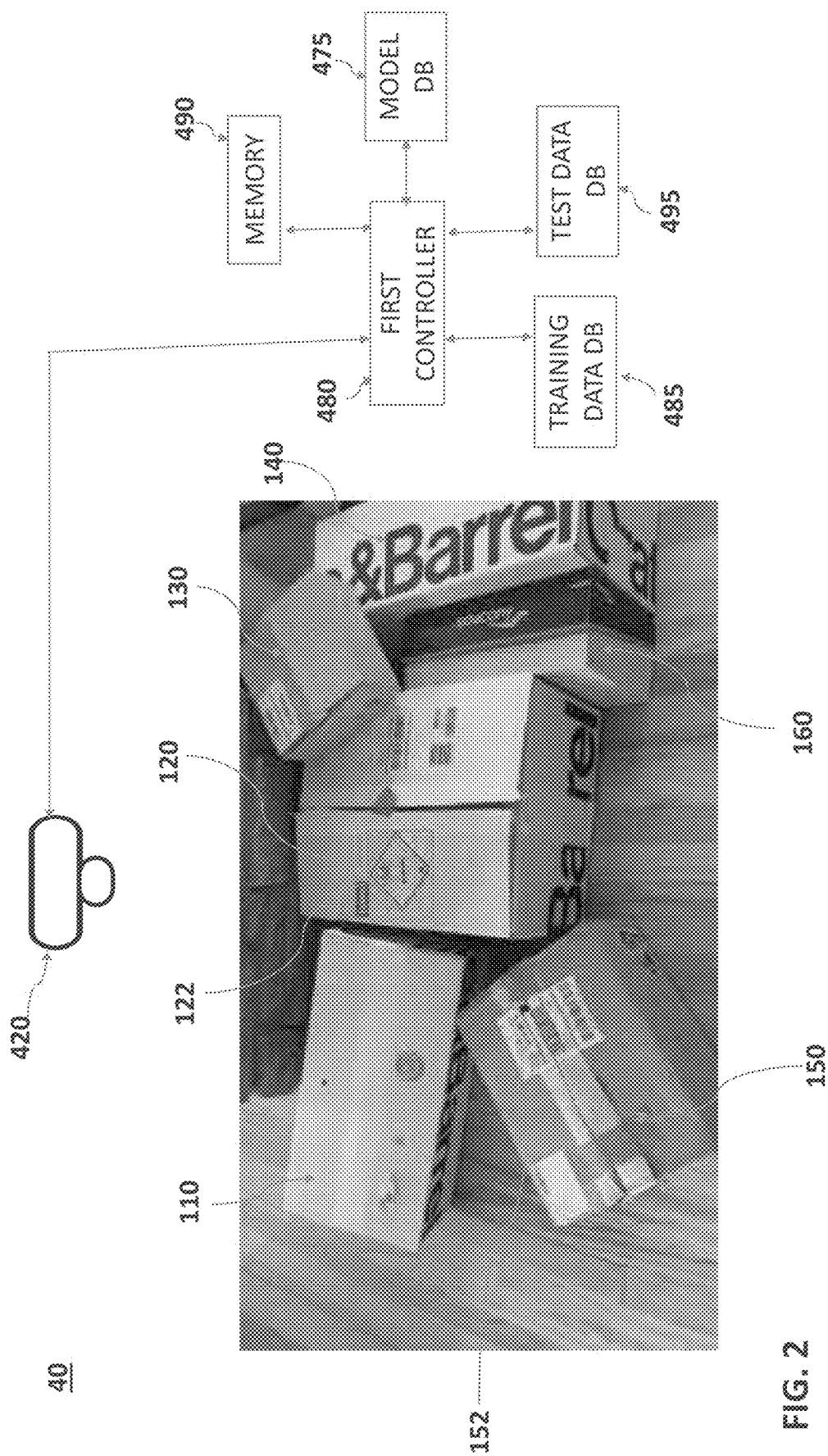
FIG. 2 illustrates an example image processing system for training a machine learning or deep learning model for automatically recognizing labels on items and for automatically recognizing labels on items using the trained model according to some embodiments.

FIG. 2 illustrates an example image processing system 40 for automatically recognizing labels provided on items and using a trained model, according to some embodiments. The training of the model will be described in greater detail below. The image processing system 40 may be part of the item processing equipment described above or can be separately provided, for example, to be disposed adjacent thereto. The image processing system 40 may include an optical scanner 420 (hereinafter to be interchangeably used with "imaging device," "optical sensor," "camera" or "reader"), a model DB 475, a training data DB 485, a test data DB 495, a first controller 480 and a memory 490. The image processing system 40 may train one or more machine learning/deep learning models stored on the model DB 475 or on the memory 490 using training data sets stored in the training data DB 485 and test data sets stored in the test data DB 495 (to be described in greater detail with respect to FIGS. 3A and 3B). The image processing system 40 may also automatically recognize labels provided on items, for example, stack of items 110-160, by running the trained model on a captured image (to be described in greater detail with respect to FIG. 10).

The image processing system 40 shown in FIG. 2 is merely an example image processing system, and certain elements may be modified or removed, and/or other elements or equipment may be added. Although only one optical scanner 420 is shown in FIG. 2, two or more optical scanners can be provided depending on the embodiment. Furthermore, the optical scanner 420 may be disposed in locations other than in FIG. 2, as long as the optical scanner 420 can capture a label disposed on one or more of the items 110-160.

In some embodiments, the image processing system 40 may also include a computing device such as a tablet (not shown) that, when pointed to the items 110-160, can recognize and display the items 110-160. The computing device may display only the items having labels thereon so that items having labels thereon can be visually identified. The computing device may include one or more of the elements 475-495.

In some embodiments, the example items 110-160 may be placed in a stockpile as shown in FIG. 2. In other embodiments, the items 110-160 may be placed in a truck such as an item delivery truck. FIG. 2 shows only an example configuration/arrangement, and the number of the items 110-160, the orientation of the items 110-160, arrangement of the items 110-160, or the way they are stacked, etc. may vary.

The items 110-160 may also have different shapes, colors, and/or sizes. Compared to substantially cube shapes (e.g., shown in FIGS. 4A-5), FIG. 2 shows example cuboids (see 110-160), such as parcels or packages. The cuboids may have larger and smaller sides, and larger and smaller labels may be attached to the corresponding sides before they are captured by the optical scanner 420. One or more of the items (e.g., item 120) may include a label 122 on its surface. Although FIG. 2 shows that the label 122 is disposed on the top surface of the item 120, the label may be disposed on other regions on the item 120, for example, side surfaces thereof. The label 122 may include, but is not limited to, warning labels, hazard labels, service class indicator labels, shipping labels, address labels, and the like. Warning labels may include cautionary labels such as "fragile," "heavy" or other labels that may indicate warning to persons who handle or receive the item. The hazardous labels may include DOT hazardous labels, for example, shown in FIGS. 1A-1D. The service class indicator labels may indicate service classes such as priority, first class, air, ground, etc.

The optical scanner 420 may capture an entirety or a portion of each of the items 110-160. The optical scanner 420 may also capture item information provided on (e.g., attached to, printed on or embedded into) an item such as the item 120. The item information thereinafter to be interchangeably used with a "label" or "item label") may include labels such as a warning label or a hazardous label 122 on the item 120, a service classification label or service class indicator label 152 on the item 150. The item information may also include information relevant to mail processing and/or delivery including, but not limited to, names and addresses of senders and recipients, postages and barcodes, a special mail region, etc. The barcodes may include an intelligent mail package barcode (IMpb). That is, as used herein, the term "label" may include information contained in at least one of a sender region, a recipient region, a combined sender-recipient region, a barcode, a postage section and a special mail region.

The optical scanner 420 may also capture more than one item at a time in one frame. Although not shown, the image processing system 40 may include a drive mechanism configured to move the optical scanner 420 to capture different items or different portions of items at different capturing angles. The image processing system 40 may include one or more additional optical scanners (not shown) in data communication with the first controller 480. The additional optical scanners may be located on the left or right side of, below or above the items 110-160, or angled with respect to the items 110-160.

The captured image may also include, for example, labels such as warning labels, service class indicator labels, shipping labels, or DOT hazardous labels. The captured image may further include non-DOT hazardous labels. The captured image may also include information (e.g., text, numbers, symbols, shape, drawing, color, etc.) provided on other objects such as products, soda cans/bottles, water bottles, or boxes, etc. For the purpose of convenience, the description will be made mainly based on the captured image being labels such as DOT hazardous labels provided on an item.

In some embodiments, the captured images or digital data thereof may be stored in the memory 490. In other embodiments, the captured images or digital data thereof may be stored in a memory of the scanner 420 or a memory of the first controller 480. In other embodiments, the captured images or digital data thereof may be stored in a network memory such as a cloud or other device separately located from the elements 420, 475, 480, 485, 490 and 495. The digital data may include binary data, where, for example, "0" represents a white pixel and "1" represents a black pixel, or vice versa.

The optical scanner 420 may be connected to the first controller 480 either by wire or wirelessly. In some embodiments, the optical scanner 420 may transmit a captured image of an item or at least one element (hereinafter to be interchangeably used with "item element") provided on an exterior surface of the item to the first controller 480. The at least one item element may include elements that are part of an item or elements that are printed on, attached to, or incorporated into an exterior surface of the item. The item elements may include, but are not limited to, an address section such as a sender section and a recipient section, a barcode section, a postage section, and a special item section, etc.

The first controller 480 may communicate data with the model DB 475, the training data DB 485, the test data DB 495 and the memory 490. In some embodiments, the model DB 475, the training data DB 485, the test data DB 495 may be built using the data building systems of FIGS. 3A and 3B (to be described in greater detail). The first controller 480 may receive or retrieve one or more of the captured images including one or more labels and recognize the one or more labels provided on items regardless of whether the labels were captured at different positions and/or in different capturing environments. The first controller 480 may also train a machine leaning/deep learning model with training data sets stored in the training data DB 485 to automatically recognize the one or more labels provided on the items (to be described in greater detail with respect to FIGS. 7 and 8). The first controller 480 may also recognize one or more labels provided on items by running the trained machine learning/deep learning model on the captured image (to be described in greater detail with respect to FIG. 10). In some embodiments, the first controller 480 may perform both the training and recognizing. In other embodiments, the first controller 480 may perform only one of the training and recognizing. In these embodiments, the image processing system 40 may include another controller or processor that performs the other of the training and recognizing.

In some embodiments, the first controller 480 may generate an initial machine learning/deep learning model from existing machine learning/deep learning models relating to computer vision or image recognition. In other embodiments, the first controller 480 may generate from scratch an initial machine learning/deep learning model relating to computer vision or image recognition. The first controller 480 may generate the initial model using machine learning model building language and its libraries. The machine learning model building language may include, but is not limited to, Python, Java, R, C++, C, JavaScript, Scala or Julia. The first controller 480 may train the generated initial model with the training data sets stored in the training data DB 485 and test the trained model with the test data sets stored in the test data DB 495. The first controller 480 may store the trained and tested model in at least one of the memory 490 or the model DB 475. The first controller 480 may also store the "trained and tested" model (to be interchangeably used with "trained" model) therein.

The model DB 475 may store one or more trained models to be used to recognize one or more labels provided on items. The trained models may be stored in a trained model section of the model DB 475. The model DB 475 may also store one or more non-trained models in a non-trained model section of the model DB 475. At least one of the non-trained models may be trained by the first controller 480 to be used to automatically recognize one or more labels provided on items, and the trained model may be stored in the model DB 475. In some embodiments, the model DB 475 may store only non-trained models and the trained models may be stored in the memory 490 and/or the first controller 480. In these embodiments, the first controller 480 may directly run the trained model(s) to recognize one or more labels provided on items without accessing the model DB 475 or the memory 490.

In some embodiments, the trained models may be used to identify features of captured images of items or item elements. For example, the trained models may be used to identify types of items such as letters, flats, parcels, or other objects.

The trained models may also be used to identify content of labels. For example, the trained models may be used to identify or recognize contents of labels such as information of a sender, a recipient, a barcode, a postage, symbols or text on a special mail region, or information on labels such as shapes, characters, designs, colors, layout, etc., captured at different positions (e.g., positions, angles, orientations) and/or in different capturing environments (e.g., item movement speeds, scanner shutter speed, intensity, color, white balance, blurriness level, lightings, shadings, contrasts, lighting conditions, or combinations thereof). The trained models may also be used to identify or recognize information on an obscured (or blurry) image of a label. The trained models may further be used to identify types of labels such as warning labels, hazardous labels, or service class indicator labels, etc. Development of the trained model will be described hereinafter.

The models may be trained with training data sets stored in the training data DB 485 to recognize department of transportation (DOT) hazard class labels such as labels containing information relating to flammable liquid or radioactive material, or other labels such as classification labels, service classes such as priority, first class, air, ground, etc., examples of which are shown in FIGS. 1A-1D.

The training data DB 485 may store a plurality of sets of training data used to train one or more of initially non-trained models. The training data sets may include previously captured or retrieved images of items or item elements that are generally different from those images used to create the trained models. The training data sets may be generated by the second controller 610 shown in FIG. 3A and FIG. 3B. The number of the training data sets may depend on the embodiments. For example, several thousand images may be used for training a machine learning or deep learning model for relatively easy recognition of a label (considering different positions and/or different capturing environments described above). Furthermore, several million or more images may be used for training the machine learning or deep learning model for relatively difficult recognition of a label (again considering different positions and/or different capturing environments described above).

The test data DB 495 may store a plurality of sets of test data used to test an identified and trained model. The test data set may include previously captured or retrieved images of items or item elements that are generally different from those images used to train the identified models and those used to create the trained models. A dataset for training machine learning can include providing a large number of images of a label of interest, or the information the machine learning algorithm is trained to identify. To generate the large number of images, an automated system which can automatically generate a large number of images of a label at various angles, under various lighting conditions, and other variables. The images can then be used to train the machine learning algorithm. This test data may be generated by the second controller 610 shown in FIG. 3A and FIG. 3B. Again, fewer numbers of test data sets may be used for testing a trained machine learning or deep learning model for relatively easy recognition of a label and more numbers of test data sets may be used for testing a trained machine learning or deep learning model for relatively difficult recognition of a label.

Although the above embodiments have been described mainly for recognizing DOT hazardous labels, the described technology may also be used to detect information (e.g., text, numbers, symbols, shape, drawing, color, etc.) provided on other objects such as parcels, soda cans/bottles, water bottles, or boxes, etc.

Figure 3A:
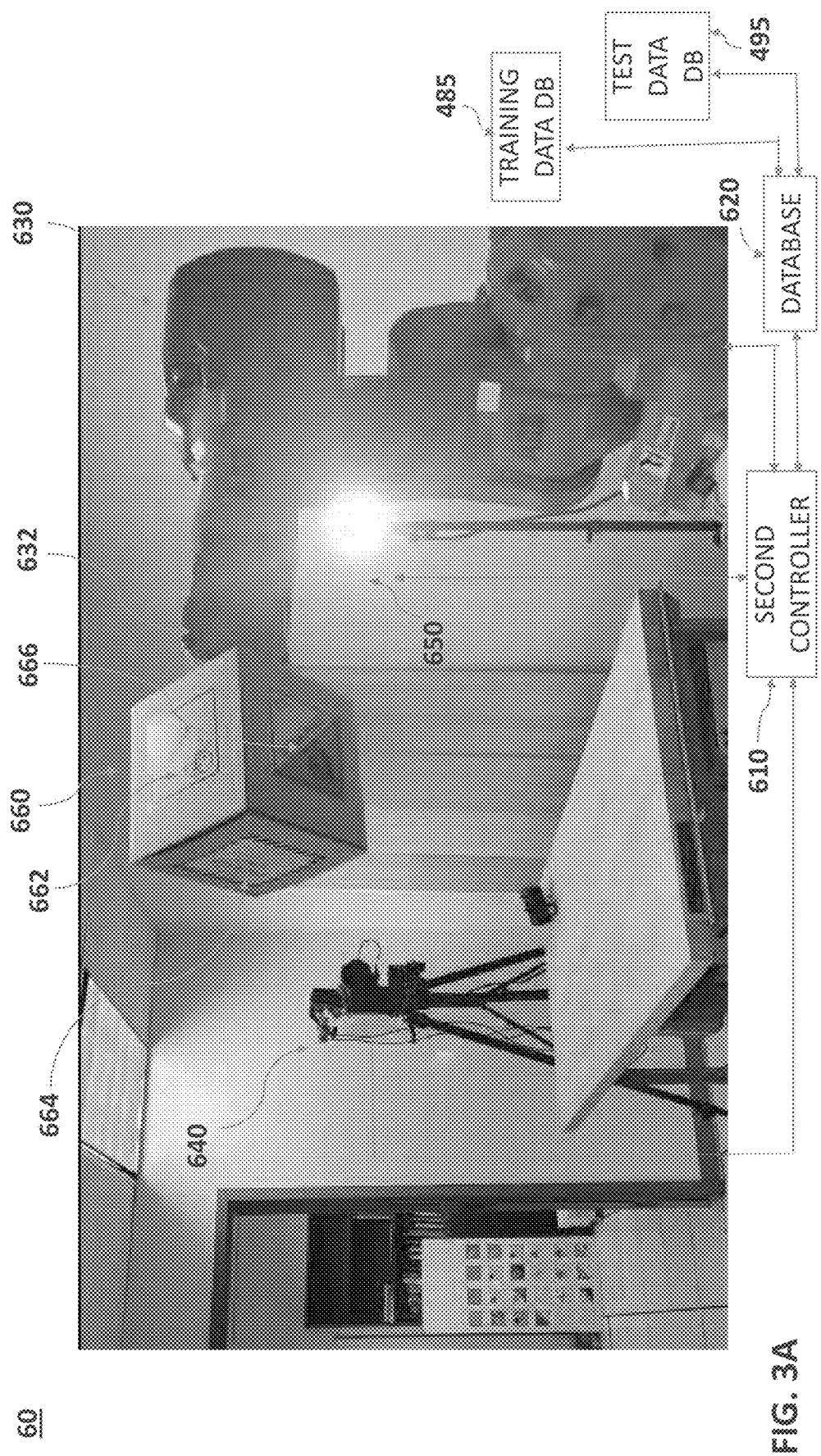
FIG. 3A illustrates an example data building system for building data sets to train a machine learning or deep learning model for automatically recognizing labels on items according to some embodiments.

FIG. 3A illustrates an example data building system 60 for building data sets to train a machine learning or deep learning model for automatically recognizing labels on items according to some embodiments. The data sets built by the system 60 may be used to train a machine learning or deep learning model which can automatically recognize labels on items. The data building system 60 may include a second controller 610, a database 620, a robot body 630, an optical scanner 640, and a light source 650. The data building system 60 may also include the training data DB 485 and the test data DB 495. The robot body 630 may include a robotic arm 632. The data building system 60 shown in FIG. 3A is merely an example data building system, and certain elements may be modified or removed, and/or other elements or equipment may be added. Although only one optical scanner is shown in FIG. 3A, two or more optical scanners can be provided depending on the embodiment.

The optical scanner 644 may capture one or more labels provided on an item 660 at different positions and/or in different capturing environments. The second controller 614 may be programmed to generate one or more machine learning or deep learning models that can fully recognize labels on items regardless of different positions/capturing environments. The second controller 610 may also train the machine learning or deep learning models with captured images. The second controller 610 may store the trained machine learning or deep learning models in the database 620 or a separate memory disposed either inside or outside the second controller 610 (not shown).

The database 620 may store the captured images, relationships and/or the generated machine learning or deep learning models. The trained machine learning or deep learning models may be executed in the first controller 480 shown in FIG. 2 to recognize labels on items (to be described in greater detail with respect to FIG. 10).

The item 664 may be held by the robotic arm 632 of the robot body 630. Although the item 660 of FIG. 3A has a cube shape, other shapes of items (e.g., flat items, inflatable items, cuboids, irregularly-shaped items, etc.) may also be used. When the item 660 is connected to the robotic arm 632, the orientation of the labels and/or details about the label on the various surfaces of the item 664 are stored. By knowing the orientation of the labels on the item 660 and the orientation of the item 660 on the robotic arm 632, the second controller 610 can identify which label is in the field of view of the optical scanner 640 when an image is taken.

The item 660 may include one or more labels 662, 664 and 666 provided on exterior surfaces of the item 660 as described above. For example, the item 660 may include a label on each of its sides. As another example, a label may be provided on two or more exterior sides of the item 660. In some embodiments, the labels 662-666 may be the same as each other. In other embodiments, at least some of the labels 662-666 may be different from the remaining labels. In some embodiments, the labels 662-666 may include DOT hazard labels (see FIGS. 1A-1D). Although FIG. 3A shows that the labels 662-666 are placed near the center of each side, the labels 662-666 may be placed in a region other than the center such as edges of each side. In some embodiments, at least one of the labels 662-666 may be disposed on more than one side of the item 660. In these embodiments, a majority portion of the at least one of the labels 662-666 may be disposed on one side and the remaining portion may be disposed on the other side(s). In other embodiments, the at least one of the labels 662-666 may be disposed substantially equally in area on two or more sides of the item 660. In some embodiments, the robotic arm 632 may rotate the item 660, for example, via the rotating mechanism 634 (not shown in FIG. 3A, see FIG. 4A), such that the optical scanner 640 may capture each of the labels 662-666 a plurality of times at different positions and/or in different capturing environments described above. The robotic arm 632 may rotate the item 660 clockwise or counterclockwise.

Although the item 660 of FIG. 3A includes a plurality of labels on multiple sides thereof, the item 660 may include a single label placed on only one side thereof. In these embodiments, the robotic arm 632 may rotate the item 660 such that the optical scanner 640 may capture the single label a plurality of times at different positions and/or in different capturing environments. The robotic arm 632 may be controlled to incrementally rotate the item 660, for example, in one or more of x, y and z directions while using same or different parameters of the capturing environments. In some embodiments, the item 660 may be rotated in one of x, y and z directions at a time. In other embodiments, the item 660 may be rotated in two or more of x, y and z directions at a time.

The robotic arm 632 may rotate the item 660 such that at least a portion of the single label can be captured by the optical scanner 640. This way, the system 60 may realize digital manipulation of a captured label to build a vast amount of data sets to train a machine learning or deep learning model. For example, some captured images may look skewed or distorted (sideways, diagonally, upward, downward, etc.), angled blurry, shadowed, darker, brighter, or more clear so that the trained machine learning or deep learning model can recognize labels in one or more of these conditions. In some embodiments, the blurry image can also be generated by adjusting optical scanner settings and/or by adjusting one or more of parameters of the capturing environments. In other embodiments, the blurry image can be generated by at least partially blocking the lens of the optical scanner 640 or the item 660 with an object such as a plate, paper, plastic, glass.

The optical scanner 640 may capture the item 660 or the one or more labels 662-666 of the item 660. The capturing may be performed a plurality of times at different positions and/or in different capturing environments. The optical scanner 640 may be programmed or controlled by the second controller 610 regarding how many pictures the optical scanner 640 take in each of the labels at different positions and/or in different capturing environments. The optical scanner 640 may also be controlled by the second controller 610 regarding camera settings to capture images having different qualities. The optical scanner 640 may store the captured images in the database 620.

The light source 650 may provide light to the item 660. For example, the light source 650 may provide different levels of brightness to the item 660 so that the item 660 may be captured at different lightings, shadings, contrasts and/or lighting conditions. The light source 650 may be controlled by the second controller 610 regarding brightness, light outputting directions, distances, to realize different levels of lightings, contrasts and/or lighting conditions. For example, if the light source 654 directly emits light to the labels 662-666, a higher contrast of a label image may be realized. In these embodiments, brightness or intensity levels of the light source 650 may be adjusted to provide more fine-tuning in terms of blurriness level, lighting, brightness and/or contrast. Although only one light source 650 is shown in FIG. 3A, two or more light sources may be provided depending on the embodiment. In some embodiments, all of these light sources may be turned on (higher brightness). In other embodiments, at least some of the light sources may be turned off (lower brightness). Furthermore, at least some of the light sources may be controlled to adjust, for example, brightness levels and light outputting directions. The light source 650 may be moved by a computer-controlled light meter (not shown) to vary its light emitting directions. The data building system 60 may include a drive mechanism (not shown) that either moves a body of the light source 650 from one position to another position or moves a lamp of the light source 650 while not moving the body of the light source 650, in order to vary its light emitting directions.

The robotic arm 632 may hold and rotate the item 660. The robotic arm 632 may horizontally and/or vertically rotate the item 660 so that the item 660 can be captured by the optical scanner 640 at different positions (e.g., different angles, distances and/or heights). The robotic arm 632 may be controlled by the second controller 610 such that the item 660 may be captured by the optical scanner 640 at different positions with respect to the optical scanner 640.

The second controller 610 may communicate data with and control the operations of the optical sensor 640, the robotic arm 632 and the database 620. For example, the second controller 610 may control the optical scanner 640 and/or the robotic arm 632 such that the optical scanner 640 captures the item 660 at different positions. The second controller 610 may also control one or more of the optical scanner 640, the robotic arm 632 and the light source 650 such that the item 664 or the labels 662-666 of the item 660 are captured in different capturing environments.

The second controller 610 may generate a machine learning/deep learning model to automatically recognize the one or more labels provided on items in a manner similar to the operation of the first controller 480 described above with respect to FIG. 2. The second controller 610 may also train the generated model and store in at least one of a memory and a model DB (not shown).

The optical scanner 640 may fully recognize one or more labels on the item 660 in certain positions and/or capturing environments. For example, such scenario may include, but is not limited to, when the item 660 is positioned or arranged in less than, for example, about 75 degrees (or about 80 degrees, about 85 degrees, or about 90 degrees) (left, right, up, down, diagonal, etc.) with respect to the camera lens of the optical scanner 640, when at least some light is provided on the item 660, or when the robotic arm 632 moves slower than a certain speed, etc. These are merely example scenarios where the optical scanner 640/the second controller 610 may fully detect a label and there could be many other scenarios to fully detect the label.

The optical scanner 640 may only partially recognize one or more labels on the item 660 at certain positions and/or capturing environments. For example, such scenario may include, but is not limited to, when the item 660 is positioned or arranged, for example, in more than about 75 degrees (or about 80 degrees, about 85 degrees, or about 90 degrees) (left, right, up, down, diagonal, etc.) with respect to the camera lens of the optical scanner 640, when no light is provided on the item 660, or when the robotic arm 632 moves faster than a certain speed, etc. Again, these are merely example scenarios where the optical scanner 640/the second controller 610 may only partially detect a label and there could be many other scenarios to only partially detect the label.

The second controller 610 may store images captured in many different positions and capturing environments in the database 620. The second controller 610 may control the database 620 to move some of the images stored in the database 620 and store them in the training data DB 485 as training data sets. The second controller 610 may also control the database 620 to move other images in the database 620 and store them in the test data DB 495 as test data sets. The second controller 610 may also store relationships between the different positions/capturing environments and whether the captured labels are recognized by the optical scanner 640 on the database 620 and the relevant data sets. The second controller 610 may use these relationships and data sets to generate or train one or more machine learning/deep learning models in the model DB 475. The second controller 610 may generate a single model that can fully recognize different types of labels. The second controller 610 may also generate a plurality of models that can be used to fully recognize a plurality of different types of labels or item elements. For example, a single machine learning or deep learning model may be used to recognize different types of labels including, but not limited to, warning labels, hazardous labels, or service class indicator labels. As another example, different machine learning or deep learning models may be used to respectively recognize different types of labels.

Figure 3B:
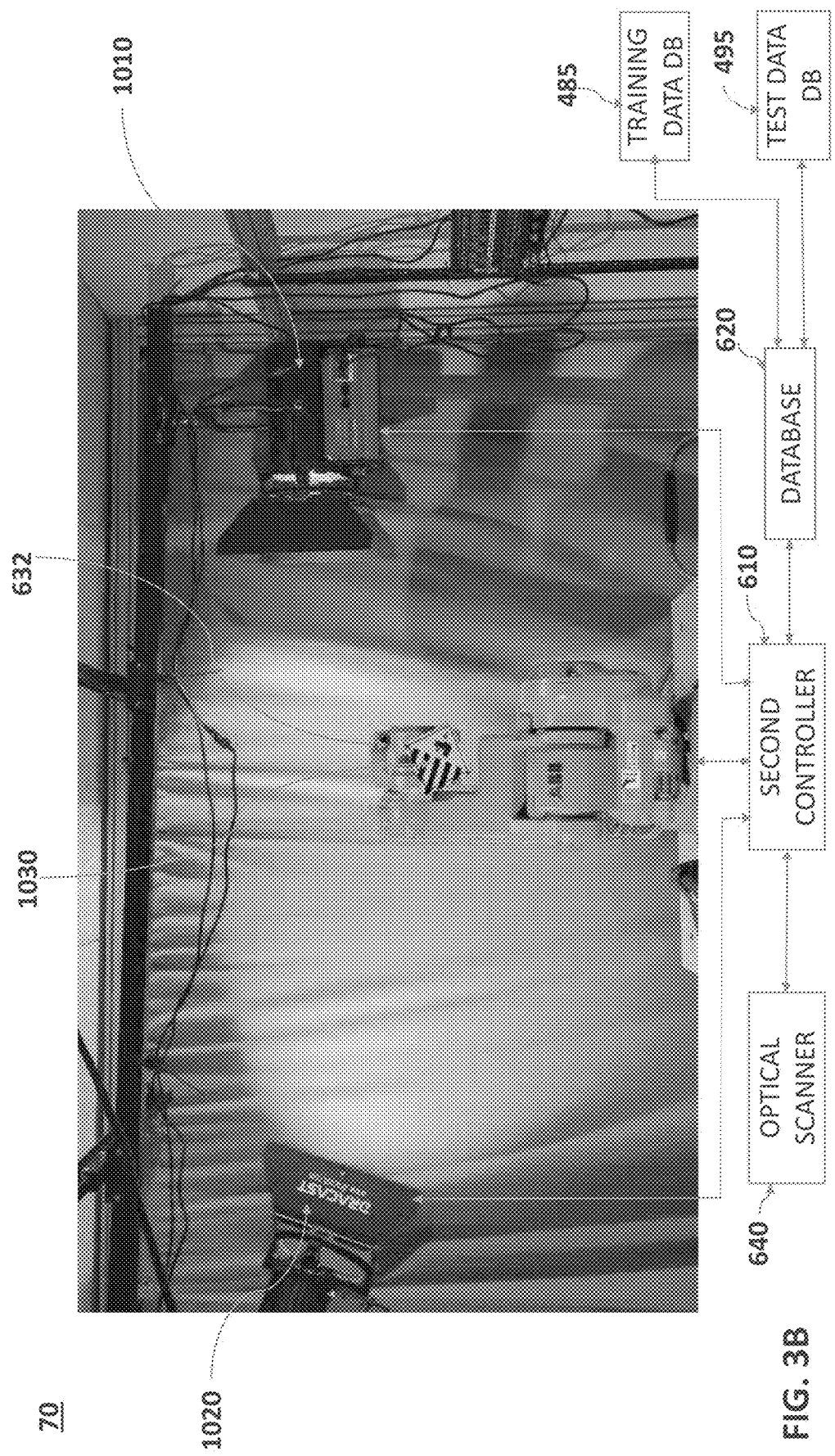
FIG. 3B illustrates another example data building system for building data sets to train a machine learning or deep learning model for automatically recognizing labels on items according to some embodiments.

FIG. 3B illustrates another example data building system 70 for building data sets to train a machine learning or deep learning model for automatically recognizing labels on items according to some embodiments. The data building system 70 may include the second controller 610, the database 620, the robotic arm 632, the optical scanner 640, a first light source 1010 and a second light source 1020. The data building system 70 may also include the training data DB 485 and the test data DB 495.

The data building system 70 shown in FIG. 3B is merely an example data building system, and certain elements may be modified or removed, and/or other elements or equipment may be added. Although only one optical scanner is shown in FIG. 3B, two or more optical scanners can be provided depending on the embodiment. Furthermore, although two light sources are shown, three or more light sources, or a single light source, or a moveable light source may also be provided.

One difference between the system 60 of FIG. 3A and the system 70 of FIG. 3B is that a label 1030 is directly attached to the robotic arm 632 in FIG. 3B instead of an item having a label thereon being attached to the robotic arm 632 as shown in FIG. 3A. The label 1030 may be made of a variety of materials such as paper, wood, plastic, metal, polymer, rubber, glass, aluminum, alloy, magnetic material, or a combination thereof, etc. In some embodiments, the label 1030 may be directly attached to the rotating mechanism 634 (not shown in FIG. 3B; see FIG. 4A). In other embodiments, a plate (not shown) may be attached to the rotating mechanism 634 and a label may be attached to the plate, for example, via an adhesive. The plate may be made of a magnetic material and be directly attached to the rotating mechanism 634 without an adhesive. In these embodiments, the rotating mechanism 634 may be made of metal. In some embodiments, the labels may include, for example, warning labels, service class indicator labels or DOT hazard labels as described above. When the label is attached to the plate, the second controller 610 can store the identity of the label and/or details about the label for use in training the algorithm.

The first light source 1010 may be positioned in one side of the robotic arm 632, for example, the left side, and may emit light to the label 1030 from the left side of the label 1030. The second light source 1020 may be positioned in another side of the robotic arm 632, for example, the right side, and may emit light to the label 1030 from the right side of the label 1030. In some embodiments, the first and second light sources 1010 and 1020 may be disposed on opposite sides of the robotic arm 632 to be substantially symmetrical with respect to the robotic arm 632. In other embodiments, the first and second light sources 1010 and 1020 may be asymmetrically positioned with respect to the robotic arm 632.

The second controller 610 may control the light sources 1010 and 1020 to provide different levels of lightings, shadows, brightness and/or contrast to the label 1030. For example, the second controller 610 may adjust at least the brightness of emitted light, light emitting directions and/or turning-on and turning-off operations of the light sources 1010 and 1020. At least one of the first and second light sources 1010 and 1020 may be moved by a computer-controlled light meter (not shown) to vary its light emitting directions. The data building system 70 may include a drive mechanism (not shown) that either moves a body of each of the light sources 1010 and 1020 from one position to another position or moves a lamp of each light source while not moving the bodies of the light sources 1010 and 1020, in order to vary their light emitting directions.

In some embodiments, the robotic arm 632 may rotate the item label 1030 such that the optical scanner 640 may capture the label 1030 a plurality of times at different positions and/or in different capturing environments. The second controller 610 may communicate data with and control the database 620, the optical scanner 640 and the light sources 1010 and 1020 to build machine learning or deep learning data sets for automatically recognizing labels. The operations of the second controller 610, the optical scanner 640, the database 620, the training data DB 485 and the test data DB 495 may be substantially the same as those of the system 60 shoe n in FIG. 3A.

Figure 4A:
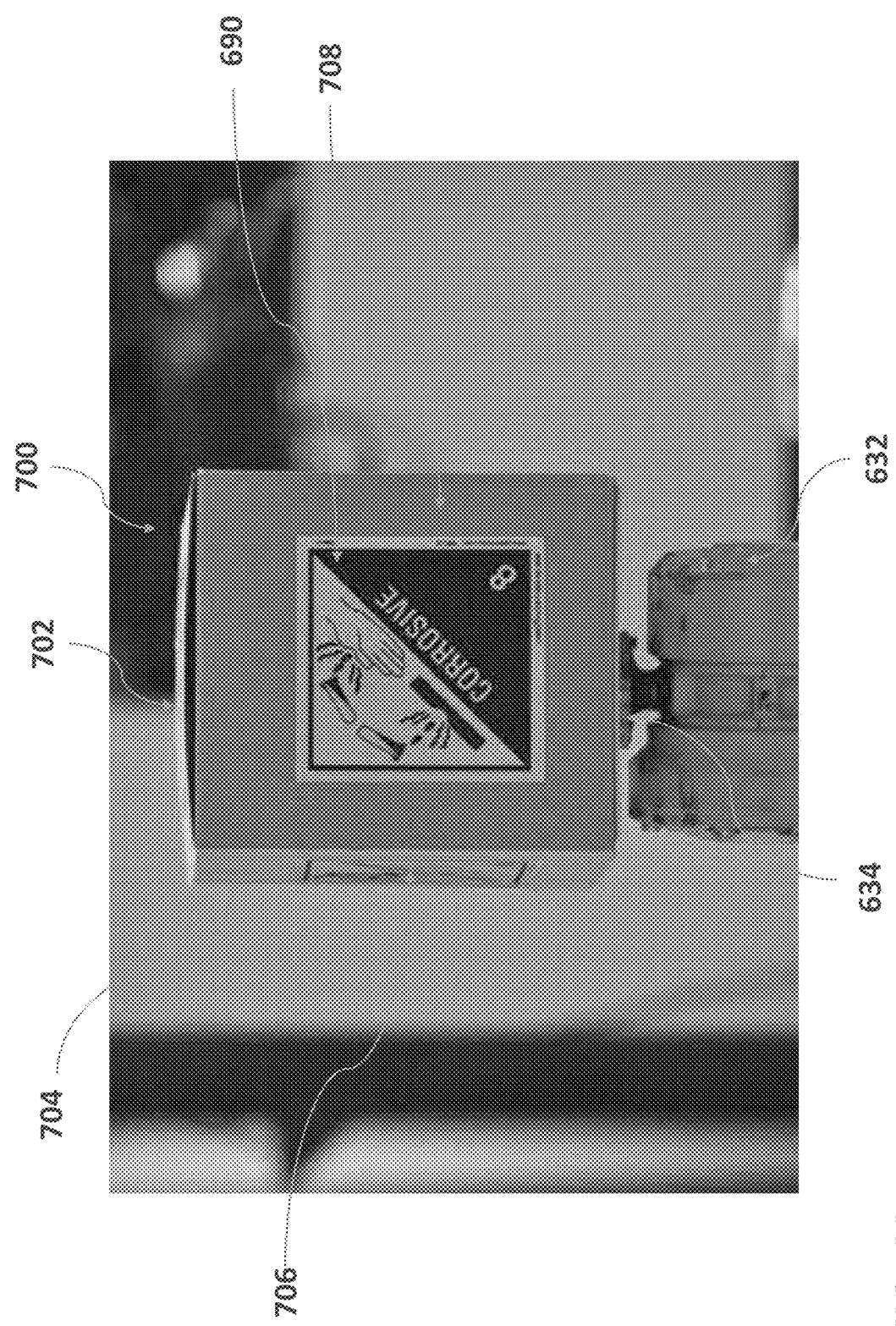
FIG. 4A illustrates an example arrangement of an item on the robotic arm of FIG. 3A according to some embodiments.

FIG. 4A illustrates an example arrangement of an item 700 placed on the robotic arm 632, where the item 700 is connected to the robotic arm 632 via a connection mechanism. The connection mechanism can be a magnetic connect, glue, tape, a mechanical fastener, etc. In some embodiments, the item 700 can have one side made of a sturdier material than cardboard which can be affixed to the robotic arm 632 via the connection mechanism, according to some embodiments. For more efficient building of machine learning data sets, the item 700 may include at least two labels including, for example, the class 8 label 690 (see FIG. 1D) on a front side 708, and a label 706 on a left side 704. As shown in FIG. 4A, the item 700 may be arranged with respect to the optical scanner 640 such that a small portion of a top side 702 of the item 700, a portion of a left side 704 of the item 704 and substantially the entirety of the front side 708 of the item 700 are captured. In this arrangement, the front label 690 may be more easily recognized by the optical scanner 640 or the second controller 610, since the label 690 can be relatively clearly seen by the optical scanner 640. In contrast, it may be more difficult or less accurate to recognize the left side label 706 (without using machine learning or deep learning), as only a small portion of the label 710 is seen by the optical scanner 640. In some embodiments, the label 706 may be at least partially or fully recognized by a computing device such as the first controller 480 by running a machine learning or deep learning model (to be described in more detail with respect to FIGS. 6-10).

The item 700 may be rotated by the rotating mechanism 634, for example, clockwise or counterclockwise. The rotating mechanism 634 may include a rotating disk, however, the present disclosure is not limited to a circular disk. For example, the rotating mechanism 634 may have other shapes such as square, rectangular, triangular, or other polygonal shapes. The rotating mechanism 634 may be vertically and/or horizontally rotated by the robotic arm 632. The item 700 of FIG. 4A may be arranged differently with respect to the optical scanner 640 by rotating the rotating mechanism 634. For example, the item 700 may be captured at different angles so that at least some portion of the front label 690 (e.g., left right, upper or lower side) is not clearly seen by the optical scanner 640. Furthermore, the item 700 may be captured at different lightings, shadings or contrasts so that the label 710 can be relatively less clearly seen by the optical scanner 640.

In some embodiments, the second controller 610 may control at least one of the optical scanner 640, the robotic arm 632 and the light source 650 so as to obtain captured images of labels in gradual changes in item/label positions and/or capturing environments. These gradually changing images may include, for example, a group of easy recognition (e.g., label 690 in FIG. 4A and labels 670 and 680 in FIG. 4B), a group of moderately difficult recognition (e.g., label 706 in FIG. 4A), and a group of difficult recognition (label 744 in FIG. 4C). These are merely example groupings, and other methods of grouping (e.g., more levels of grouping or less levels of grouping) are also possible. In some embodiments, by using machine learning or deep learning on the captured images in the group of easy recognition, captured images in the group of moderately difficult recognition and/or the group of difficult recognition may be fully recognized. In other embodiments, by using machine learning or deep learning on the captured images in the group of easy recognition and/or captured images in the group of moderately difficult recognition, captured images in the group of difficult recognition may be fully recognized. There are merely examples of building data sets of captured images in many different positions/capturing environments to be used for machine learning or deep learning. This may apply to the items 720, 740 and 760 shown in FIGS. 4B-4D. As images are captured, the second controller 610 knows which label or labels are within the field of view of the optical scanner 640. By using the known label and the images of the label, the second controller 610 can train the machine learning or AI model, as will be described in greater detail herein.

Figure 4B:
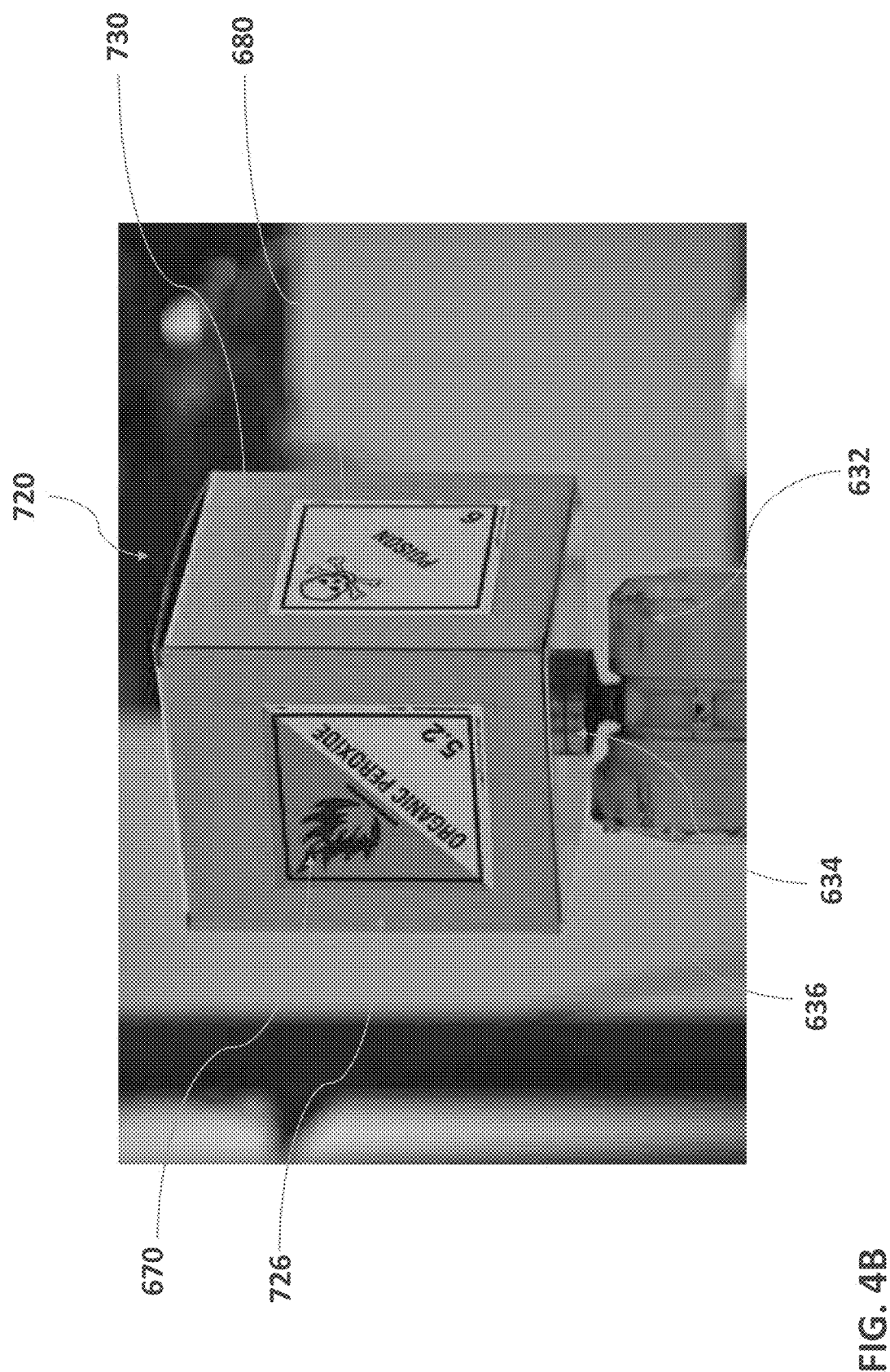
FIG. 4B illustrates another arrangement of an item on the robotic arm of FIG. 3A according to some embodiments.

FIG. 4B illustrates another arrangement of an item 720 on the robotic arm 632 according to some embodiments. The robotic arm 632 may include rotating mechanism 634 and a supporting plate 636. The item 660 may be attached to the supporting plate 636, which may be attached to the rotating mechanism 634. The item 720 may include at least two labels including the DOT class 5.2 label 670 (FIG. 1B) on a left side 726 of the item 720, and the DOT class 6 label 680 (FIG. 1C) on a right side 730 of the item 720. As shown in FIG. 4B, the item 720 may be arranged with respect to the optical scanner 640 such that a substantial portion of the left side 726 and the label 670 and a substantial portion of the right side 730 and the label 680 are captured. In this arrangement, both of the left and right labels 670 and 680 may be more easily recognized by the optical scanner 640 or the second controller 610, since each of the labels 670 and 680 can be relatively clearly seen by the optical scanner 640. In some embodiments as shown in FIG. 4B, the item 720 is tilted slightly upward so that a top side of the item 720 is not seen and a portion of a plate 636 on a bottom side of the item 720 is seen by the optical scanner 640 in other embodiments, the item 720 may not be tilted but the optical scanner 640 may be lowered in position to capture the item 720 at an angle such that a top side of the item 720 is not captured and a portion of a plate 636 on a bottom side of the item 720 is captured by the optical scanner 640.

Figure 4C:
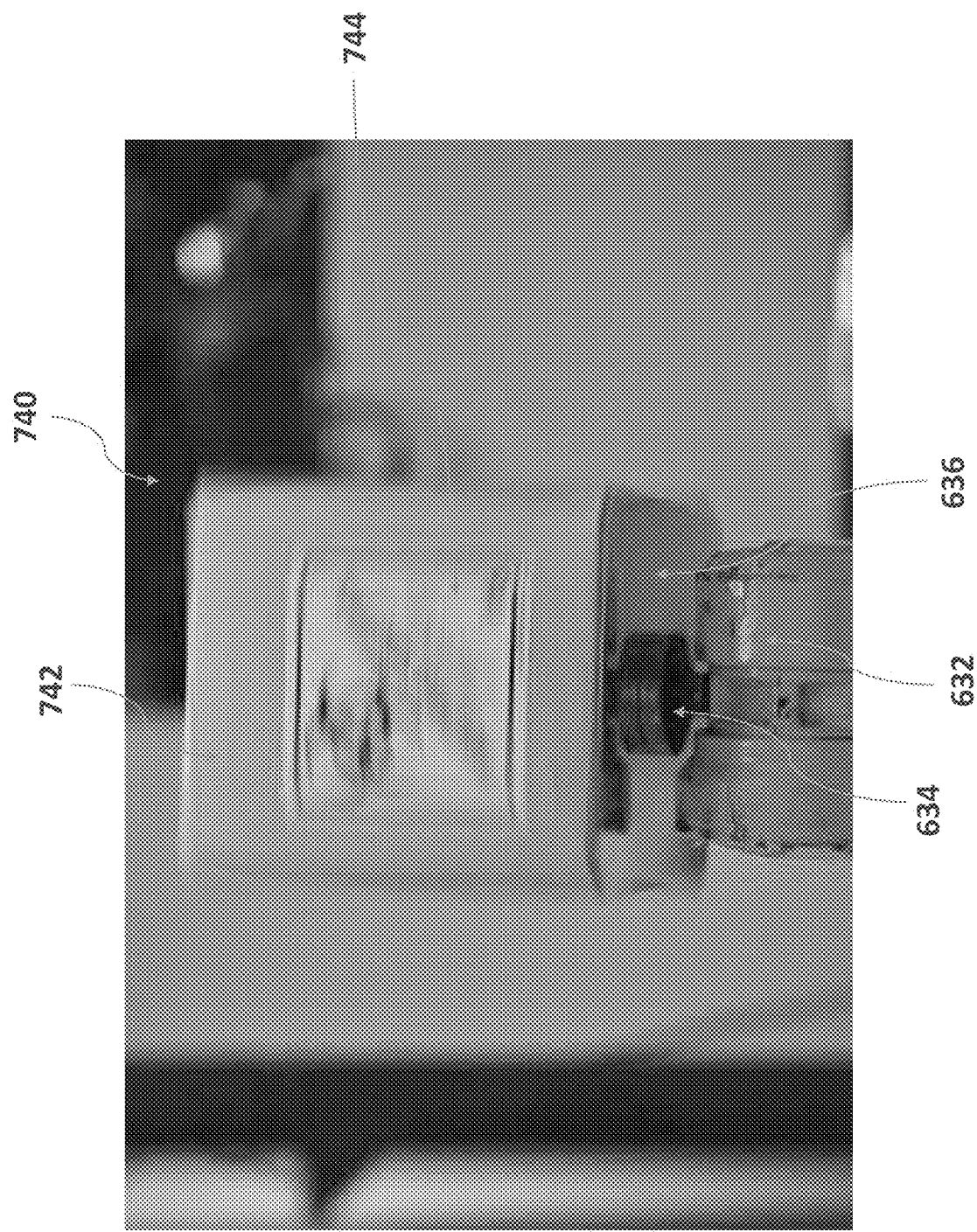
FIG. 4C illustrates another example arrangement of an item on the robotic arm of FIG. 3A according to some embodiments.

FIG. 4C illustrates another example arrangement of an item 740 on the robotic arm 632 according to some embodiments. The item 744) may include a label 744 on a front side 742 thereof. As shown in FIG. 4C, the item 740 may be captured while it is being rotated (e.g., horizontally) such that the front label 744 appears blurry on a captured image. The second controller 610 may control a rotating speed of the robotic arm 632 to adjust blur levels of the captured image of the label 744.

Figure 4D:
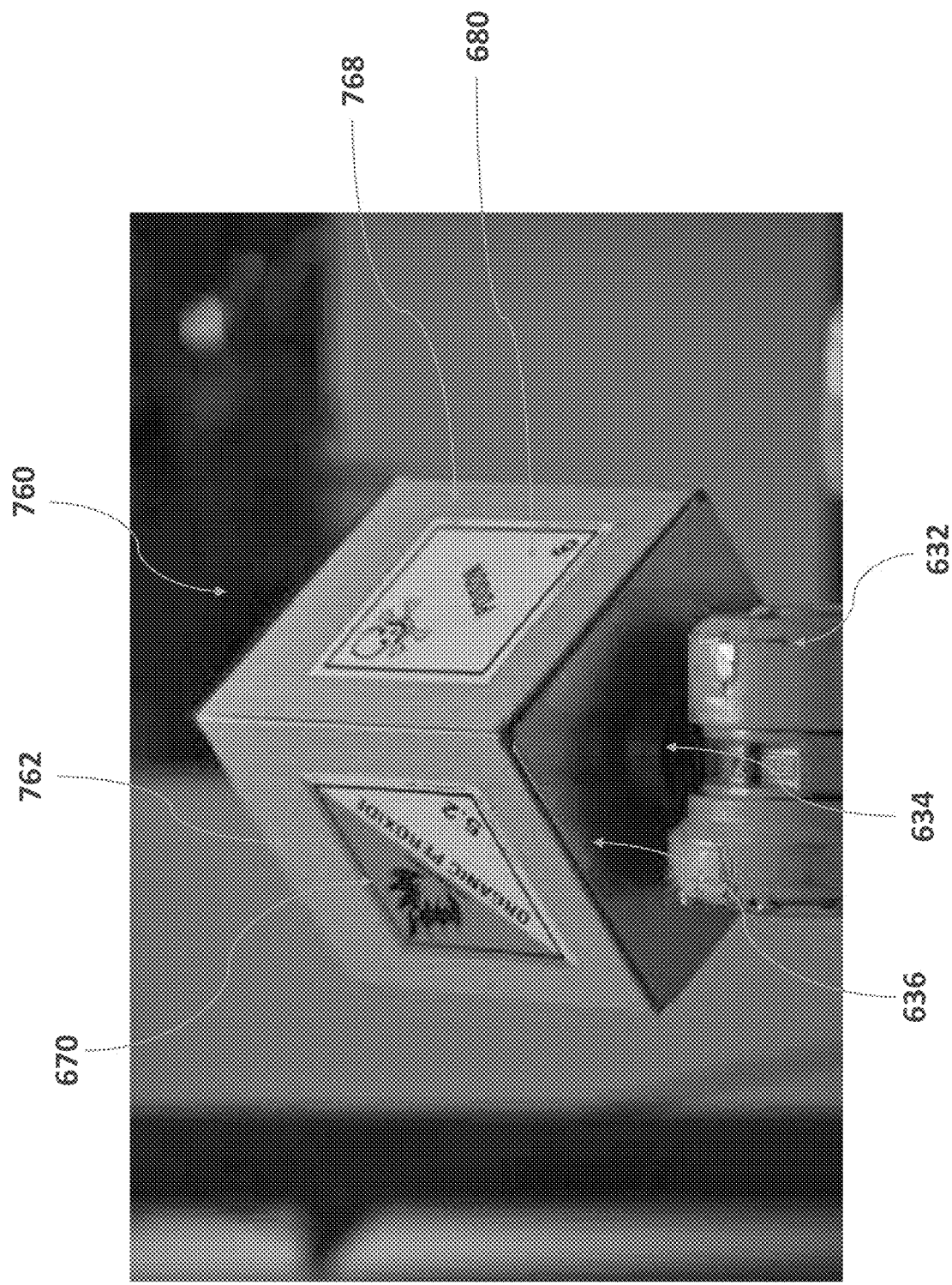
FIG. 4D illustrates another example arrangement of an item on the robotic arm of FIG. 3A according to some embodiments.

FIG. 4D illustrates another example arrangement of an item 760 on the robotic arm 632 according to some embodiments. The item 760 may include at least two labels including the DOT class 5.2 label 670 on a left side 762 of the item 760, and the DOT class 6 label 680 on a right side 768 of the item 760. As shown in FIG. 4D, the item 760 may be arranged with respect to the optical scanner 640 such that a substantial portion of the left side 762 and the label 670 and a substantial portion of the right side 768 and the label 680 are captured. In this arrangement, both of the left and right labels 670 and 680 may be more easily recognized by the optical scanner 640 or the second controller 610. Furthermore, compared to the item 740 shown in FIG. 4C, the item 760 is more tilted upward so that a top side of the item 760 is not seen and a larger portion of the plate 636 on a bottom side of the item 760 is seen. In some embodiments, similarly to FIG. 4B, the item 760 may not be tilted but the optical scanner 640 may be lowered in position to capture the item 760 at an angle such that a top side of the item 760 is not captured and a portion of a plate 636 on a bottom side of the item 764 is captured by the optical scanner 640.

Figure 5:
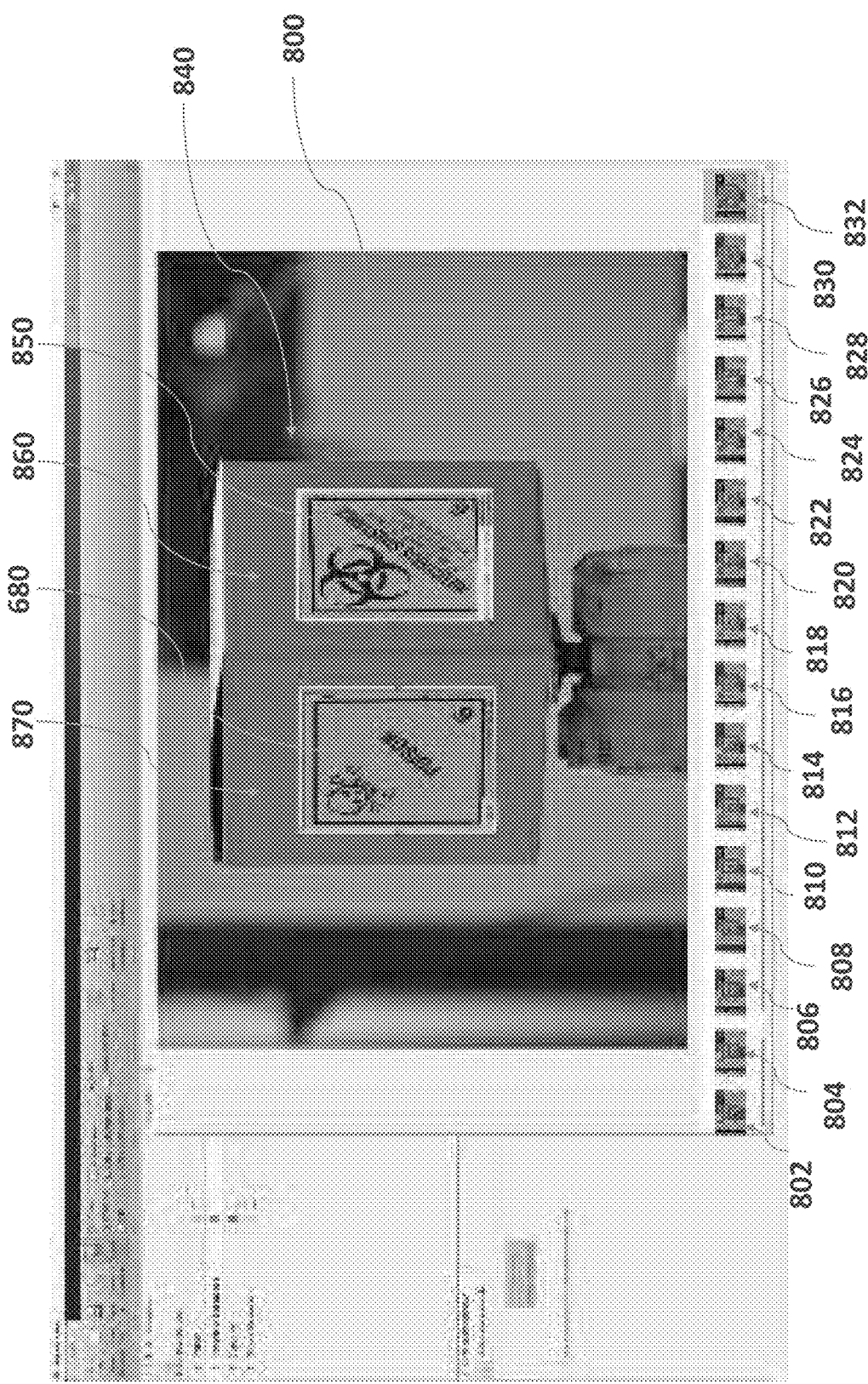
FIG. 5 illustrates example images of an item sequentially captured at different positions according to some embodiments.

FIG. 5 illustrates an embodiment of an interface for taking images of an item. The images are sequentially captured at different positions and/or in different capturing environments according to some embodiments. Referring to FIG. 5, a main image 804 of an item 840 is shown on a main screen. The main image 800 shows the hazardous class 6 label on the left side 870 of the item 840 and another label 850 on the right side 860 of the item 840. FIG. 5 also shows a plurality of images 802-832 sequentially captured by the optical scanner 640 which are shown on smaller screens below the main screen. The images 802-832 may be captured at different positions and/or in different capturing environments. The images 802-832 may be captured so that at least part of the labels 680 and 850 are captured by the optical scanner 640.

One of the smaller images 802-832 can be shown on the main screen as a main image when selected. For example, the image 832 is selected and shown on the main screen as the main image 800. Although only 16 small images are shown, more images (e.g., hundreds, thousand or more images) can be captured to show at least part of the labels 680 and 850 at different positions and/or in different capturing environments. Furthermore, less than 16 small images can be captured to show at least part of the labels 680 and 850 at different positions and/or in different capturing environments.

The captured images may be stored in the database 620. The second controller 610 may also store in the database 620 the relationships between 1) the different positions and/or different capturing environments and 2) whether the captured labels are fully recognized.

Although FIGS. 4A to 5 show more than one label per item, these arrangements are for efficiently building data sets and the labels on each of the items 700-760 and 840 may be captured or recognized individually. For example, the labels may not be captured with another label on another face of the item.

Figure 6:
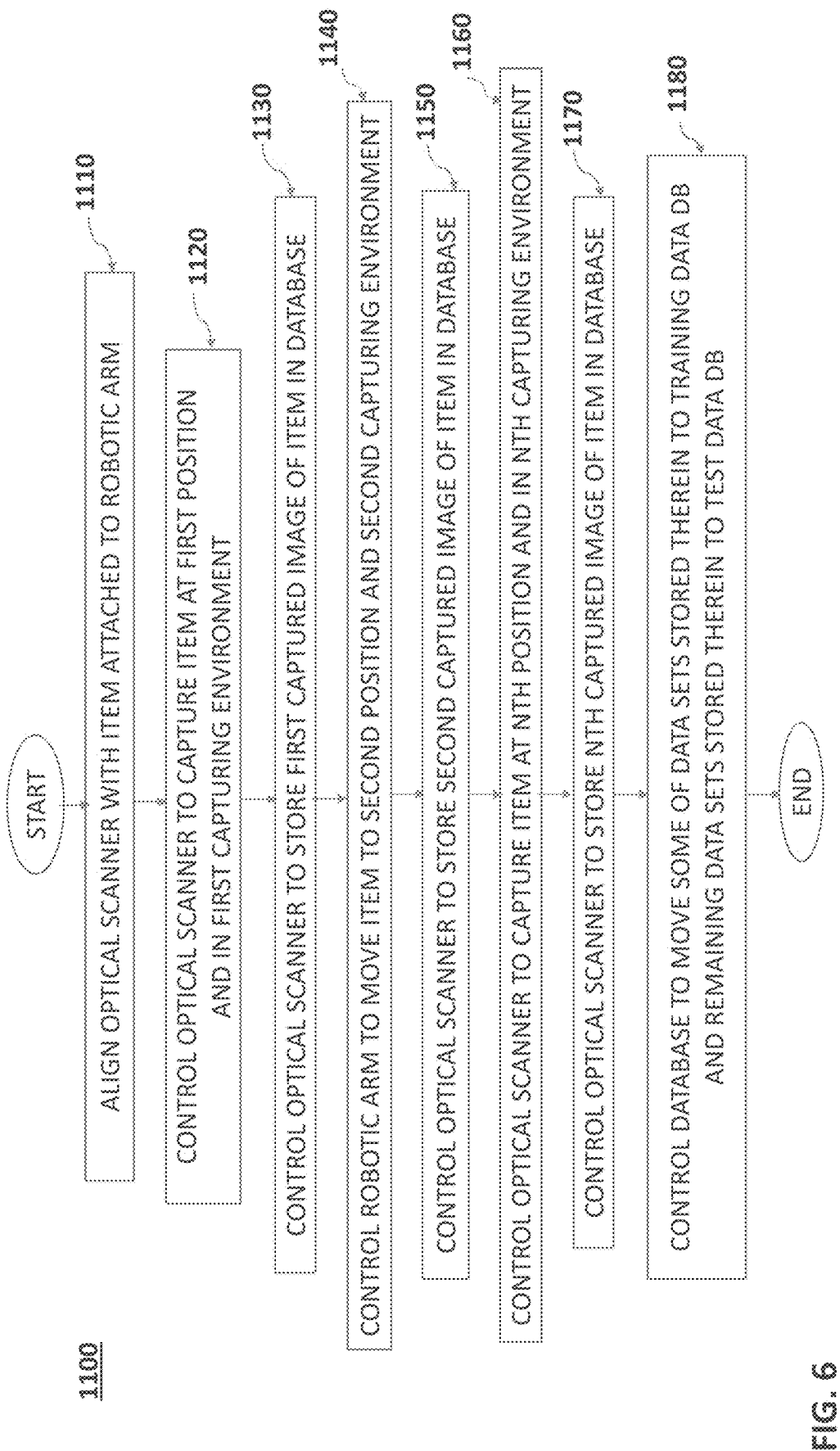
FIG. 6 is a flow diagram illustrating an exemplary method for building data sets to train a machine learning or deep learning model for automatically recognizing labels on items according to some embodiments.

FIG. 6 is a flow diagram of an exemplary process 1104 for building data sets to train a machine learning or deep learning model for automatically recognizing labels on items according to some embodiments. Although the flow diagram 1100 is described herein with reference to a particular order, in various embodiments, states herein may be performed in a different order, or omitted, and additional states may be added. This may apply to the processes 1300, 1500 and 1600 shown in FIGS. 7, 9 and 10. The flow diagram 1100 may be implemented by a computing device such as the second controller 610 of FIG. 3A. For the purpose of the convenience, the description will be made based on the second controller 610 of FIG. 3A performing the flow diagram 1100.

Before the flow diagram 1100 is performed, an item having a label thereon may be attached to a plate 636 disposed on the robotic arm 632 (see, e.g., FIG. 3A). The flow diagram 1100 will be described in connection with FIG. 3A.

In state 1110, the second controller 610 may control at least one of the optical scanner 640 and the robotic arm 632 to at least partially align the lens of the optical scanner 640 with the item 660 attached to the plate 636 disposed on the robotic arm 632. For example, the second controller 610 may move the optical scanner 640 to at least partially align the lens of the optical scanner 640 with the item 660 attached to the plate 636. As another example, the second controller 610 may also move the robotic arm 632 to at least partially align the lens of the optical scanner 640 with the item 660. As another example, the second controller 610 may also move both the optical scanner 640 and the robotic arm 632 to at least partially align the lens of the optical scanner 640 with the item 660. For the purpose of convenience, an optical scanner drive device that moves the optical scanner 640 is not shown in FIG. 3A.

In state 1120, the second controller 610 may control the optical scanner 640 to capture the item 660 at a first position and in a first capturing environment. The first position may be an initial position of the item 660 which is at least partially aligned with the lens of the optical scanner 640. The position may also include, but is not limited to, one or more of angles or distances between the lens of the optical scanner 640 and the item 660, orientations of the item 660 with respect to the lens of the optical scanner 640. The first capturing environment may include, but is not limited to, robotic arm or item movement speeds, optical scanner settings such as optical scanner shutter speeds, focus, intensity, color, white balance, lightings, shadows, contrasts and/or lighting conditions, etc. The first capturing environment may also include obscuring a label as shown in FIG. 4C. The level of the obscureness may be about 5%, about 10%, about 25%, about 50%, about 75%, etc. These percentages are merely examples and other percentages are also possible. Obscureness may extend generally in one or more of x, y or z directions. In some embodiments, obscuring the label may be obtained by adjusting optical scanner settings, by blocking at least partially the lens of the optical scanner 640, by capturing the label while moving or rotating the item 660 or by adjusting one or more of the parameters as described above.

In state 1130, the second controller 610 may control the optical scanner 640 to store a first captured image of the item 660, taken at the first position and in the first capturing environment, in the database 620. The second controller 610 also stores the known identity of the label or labels in the field of view of the optical scanner 640 at the first position in the first capturing environment. By using the known label in the field of view of the optical scanner 640 and the plurality of pictures taken in many positions and under many capturing environments, the model can be trained to recognize particular labels.

In state 1140, the second controller 610 may control the robotic arm 632 to move the plate 636 to a second position and set the optical scanner 640 in a second capturing environment. The second position may be different from the first position. In some embodiments, the second controller 610 may control the robotic arm 632 to incrementally move the plate 636 in one or more of three different directions (x, y, z) at a time or at different times. For example, the robotic arm 632 may be controlled to move the plate 636 at certain angles such as about 0.1 degrees, about 0.5 degrees, about 1 degree, about 2 degrees, about 5 degrees, etc., in one or more of x, y or z direction. The movement may continue until arriving at a certain degree (e.g., about 90 degrees, about 180 degrees, about 270 degrees, or about 360 degrees). In other embodiments, the robotic arm 632 may be controlled to move the plate 636 at certain amounts such as about 5 mm, about 10 mm, about 20 mm, about 50 mm, about 0.5 inches, about 1 inch, about 2 inches, etc., in one or more of x, y or z direction. These movements are merely examples, and the plate 636 can be moved in other angles and/or amounts in any one or more of the x, y and z directions. The movement directions and amounts can be any combinations of x, y, z and the movement degrees described above. The second capturing environment may be the same as or different from the first capturing environment. For example, the second capturing environment may have one or more different focuses, shutter speeds, lightings, etc., with respect to the first capturing environment. In some embodiments, the second position may be the same as the first position whereas the second capturing environment may be different from the first capturing environment. In other embodiments, the second position may be different from the first position whereas the second capturing environment may be the same as the first capturing environment.

In state 1150, the second controller 610 may control the optical scanner 640 to store the second captured image of the item 660, taken at the second position and in the second capturing environment, in the database 620.

In state 1160, the second controller 610 may control the optical scanner 640 to capture the item 660 at an nth position and in an nth capturing environment. The nth position may be the same as or different from any of the first to (n−1)th positions (n is a natural number). The nth capturing environment of the item 660 may be the same as or different from any of the first to (n−1)th capturing environments of the item 660. The combination of the first position and the first capturing environment may be different from the combination of the nth position and the nth capturing environment. For example, the nth position may be the same as the (n−1)th position whereas the nth capturing environment may be different from the (n−1)th capturing environment. Furthermore, the nth position may be the same as the (n−1)th position whereas the nth capturing environment may be different from the (n−1)th capturing environment.

As described above, the capturing environment includes one or more factors. In some embodiments, at least one of the factors may be different in the first and nth capturing environments. In other embodiments, all of the factors may be the same as each other in the first and nth capturing environments. In these embodiments, the nth position may be different from the first position.

In state 1170, the second controller 610 may control the optical scanner 640 to store the nth captured image of the item 660, taken at the nth position and in the nth capturing environment, in the database 620, as well as the known identity of the label visible to the optical scanner 640 in the nth position and in the nth capturing environment.

In state 1180, the second controller 610 may control the database 620 to move some of the data sets stored therein to the training data DB 485 and the remaining data sets stored therein to the test data DB 495. In some embodiments, the second controller 610 may control the database 620 to store a greater portion of the data stored in the database 620 to move to the training data DB 485 than to the test data DB 495 such that more data sets are stored in the former than the latter. In other embodiments, the second controller 610 may control the database 620 to store a lesser portion of the data stored in the database 620 to move to the training data DB 485. In these embodiments, the second controller 610 may control the database 620 to store the remaining portion of the data stored in the database 620 to move to the test data DB 495. In other embodiments, the second controller 610 may control the database 620 to equally divide the data stored in the database 620 to move to the training data DB 485 and the test data DB 495.

Figure 7:
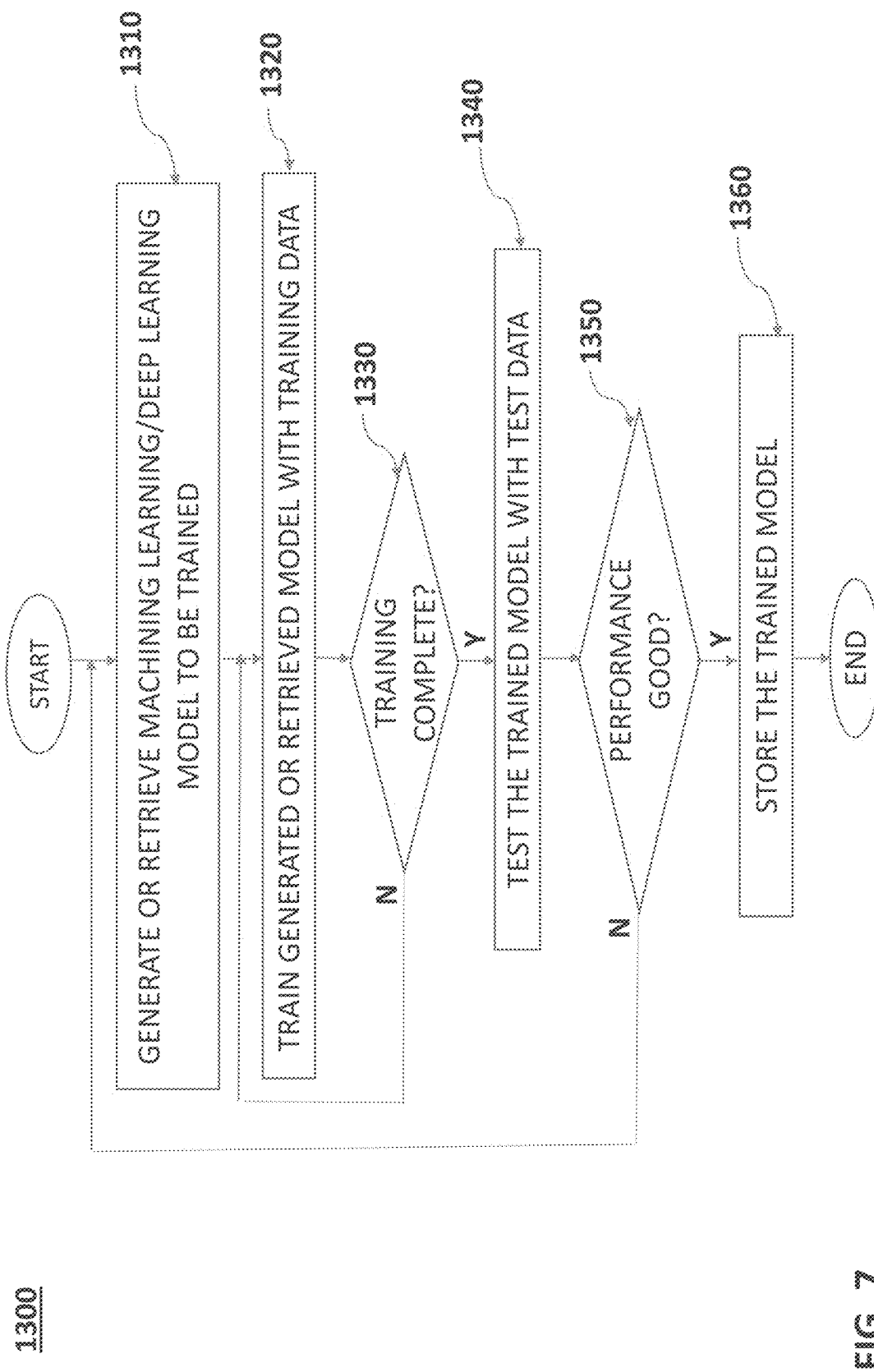
FIG. 7 is a flow diagram illustrating an exemplary method for training a machine learning or deep learning model for automatically recognizing labels on items according to some embodiments.
Figure 8:
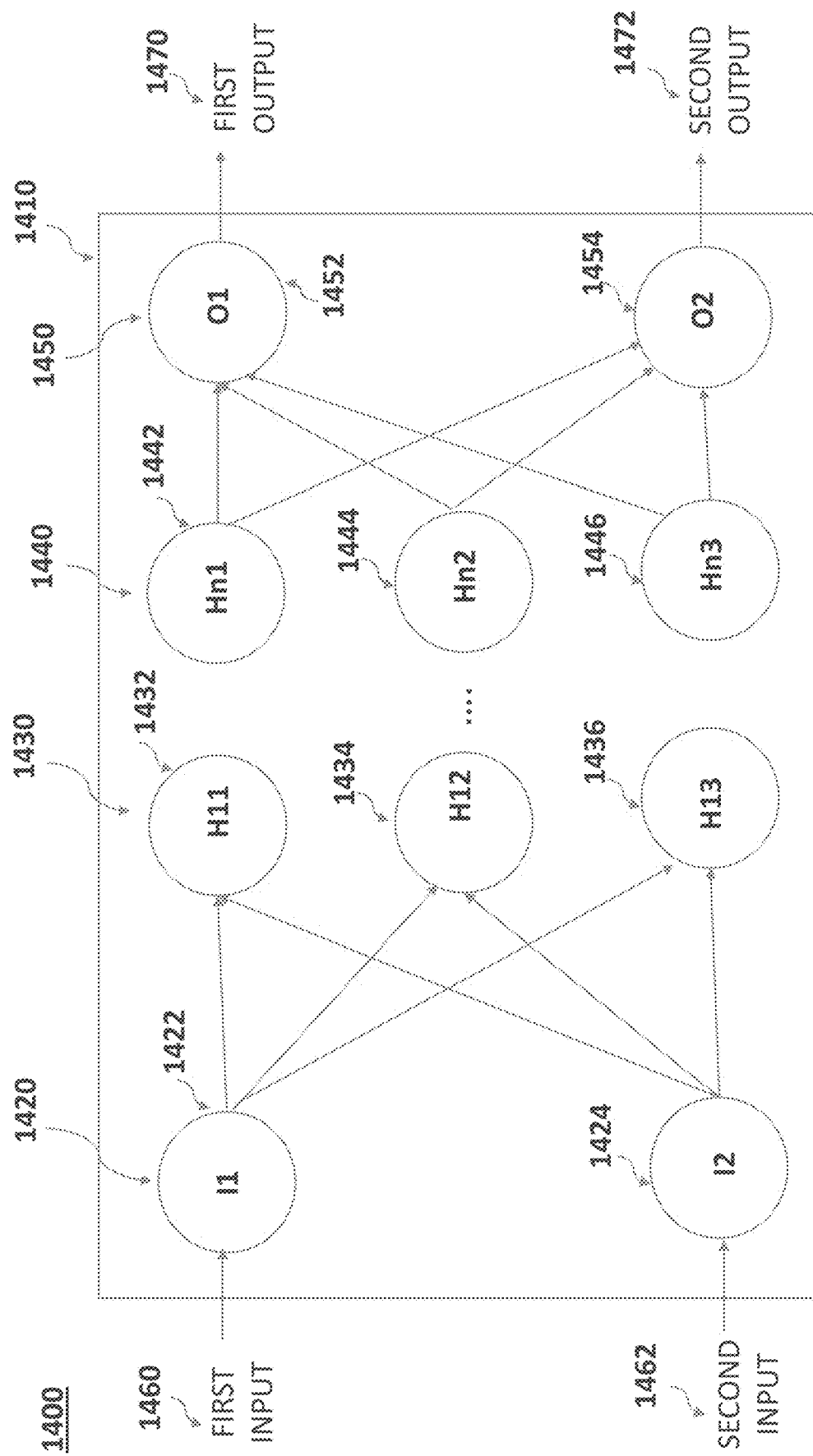
FIG. 8 is a node diagram illustrating an example neural network for performing the machine learning or deep learning operation of FIG. 7.

FIG. 7 is a flow diagram illustrating an exemplary process 1300 for training a machine learning or deep learning model for automatically recognizing labels on items according to some embodiments. The flow diagram 1300 may be implemented by a computing device such as the first controller 480 of FIG. 2 or the second controller 610 shown in FIGS. 3A and 3B. For the purpose of convenience, the description will be made based on the method for training labels, although other objects, symbols, characters, information, etc., can also be trained. FIG. 7 is merely an example flow diagram for training a machine learning model, and certain states elements may be removed, other states added, two or more states combined or one state can be separated into multiple states depending on the specification and requirements. FIG. 8 is a node diagram 1400 illustrating an example neural network for performing the machine learning or deep learning operation of FIG. 7. The node diagram 1400 may be implemented by a computing device such as the first controller 480. For the purpose of the convenience, the description will be made based on the first controller 480 performing the flow diagram 1300 of FIG. 7 and the node diagram 1400 of FIG. 8.

In state 1310, the first controller 480 may generate or retrieve a machine learning or deep learning model to be trained. As described above, the first controller 480 may generate the machine learning or deep learning model relating to image recognition from scratch or from an existing relevant model. The first controller 480 may also retrieve the machine learning or deep learning model from the model DB 475 or the memory 490. The first controller 480 may store a relevant machine learning or deep learning model to be trained.

In state 1320, the first controller 480 may train the generated or retrieved model with training data sets stored in the training data DB 485 in some embodiments, in training the generated or retrieved model, parameters of the model can be modified until the model produces (or "converges") on) the correct or desired output. For instance, a correct output of an image recognition model may include generating an output that identifies the subject included in the image. This allows the model to evolve by adjusting weight values to affect the output for one or more hidden nodes (see 1420-1450 shown in FIG. 8). The changing of the weight values may be performed through a variety of methods such as random weight updates or backward propagation sometimes referred to as "back propagation." Back propagation includes comparing the expected model output with the obtained model output and then traversing the model to determine the difference between the expected node output that produces the expected model output and the actual node output. An amount of change for one or more of the weight values may be identified using this difference such that the model output more closely matches the expected output.

In some embodiments, the first controller 480 may use the node diagram 1400 for a machine learning or deep learning neural network model 1410 shown in FIG. 8 in training the retrieved model. Referring to FIG. 8, the neural network model 1410 includes a plurality of hidden nodes: two nodes I1 (1422) and I2 (1424) at an input layer 1420, three nodes H11 (1432), H12 (1434) and H13 (1436) at a first middle layer 1430, three nodes Hn1 (1442), Hn2 (1444) and Hn3 (1446) at an nth middle layer 1440, and two nodes 1452 (O1) and 1454 (O2) at an output layer 1450. The neural network model 1410 may be trained on input data such as a first input 1460 and a second input 1462 and provide output data such as a first output 1470 and a second output 1472. In some embodiments, one or more of the inputs 1460 and 1462 may be captured images at least one of which includes labels thereon, and one or more of the outputs 1470 and 1472 may include an identified item having a label.

Although FIG. 8 shows only two inputs and two outputs, depending on the embodiment, more than or less than two inputs can be used, and/or more than or less than two outputs can be used. In some embodiments, each layer may process over, for example, 100, 1,000, 10,000, 100,000, 1,000,000 or greater parameter values. Furthermore, the model 1410 shown includes n middle layers. However, depending on the embodiment, only one middle layer or more than two layers (e.g., 4, 5, 7, 12, 30 or more layers) can be used. To further emphasize the complexity of the models, the number of nodes at each layer is shown as being two or three in FIG. 8, but can be increased to factors of ten or one hundred in some embodiments. The lines connecting each node are each associated with a weight.

Referring back to FIG. 7, in state 1330, the first controller 480 may determine whether the training process is complete. The determination may be based on the accuracy of the outputs generated by the identified model for a set of inputs. The accuracy of the outputs may be compared to an accuracy threshold or other target accuracy metric. In some embodiments, the completion may be based on resources spent training such as processor time, processor cycles, memory utilization, or other detectable characteristic of the system.

If it is determined in state 1330 that the training process is not complete, the states 1320 and 1330 may repeat, for example, until the training process is complete. If it is determined in state 1330 that the training process is complete, the first controller 480 may test the trained model (state 1340). In some embodiments, the testing may be performed using one or more test data sets stored in the test data DB 495. The test data sets may be different from the training data sets stored in the training data DB 485.

In state 1350, the first controller 480 may determine whether the performance of the tested model is good or sufficient. The determination of the performance may be based on the accuracy of the outputs generated by the identified model fora set of inputs as described above, fit is determined in state 1350 that the performance is not good or sufficient, the states 1310-1350 may repeat, for example, until the performance is sufficient. If it is determined in state 1350 that the performance is good or sufficient, the first controller 480 may store the tested model to be used to recognize a label of the captured image (state 1360). The tested model may be stored in one or more of the model DB 475, the first controller 480 or the memory 490.

In some embodiments, the first controller 480 may use a classification model in performing one or more of the states 1310-1350 of FIG. 7. Generally, a classification model is a supervised learning approach in which a computer program learns from data input given to it and then uses this learning to classify new observation. This data set may simply be bi-class (like identifying whether the person is male or female or that the email is spam or non-spam) or it may be multi-class too. Some examples of classification problems may include speech recognition, handwriting recognition, biometric identification, document classification, etc. Types of classification algorithms may include, but are not limited to, linear classifiers, logistic regression, Naive Bayes classifier, nearest neighbor, support vector machines, decision trees, boosted trees, random forest and neural networks. For example, a classification model may be trained using distances between a region and the corners of the item. The distances may be calculated from the center of the region to the respective corner. The distances may be collected as a vector of values and provided to the classification model using the vector, the classification model may provide a classification for the region (e.g., return address, mailing address, postage, barcode, unknown). The classification model may also provide a confidence indicating a confidence that the resulting classification is the "correct" classification. The analysis may also include character recognition.

Figure 9:
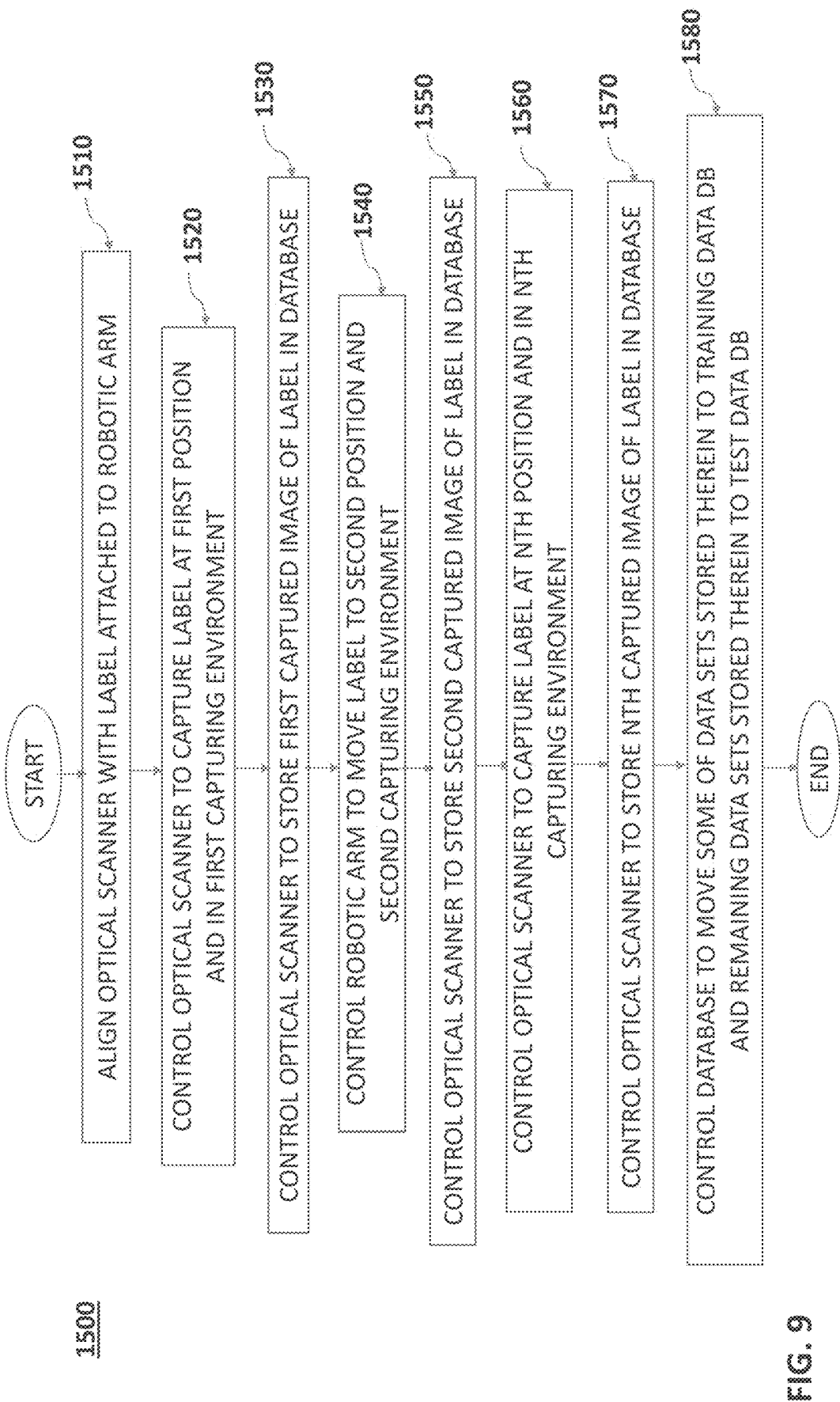
FIG. 9 is another flow diagram illustrating an exemplary method for building data sets to train a machine learning or deep learning model for automatically recognizing labels on items according to some embodiments.

FIG. 9 is a flow diagram illustrating an exemplary process 1500 far building data sets to train a machine learning or deep learning model for automatically recognizing labels on items according to some embodiments. The main difference between the flow diagram 1100 shown in FIG. 6 and the flow diagram 1500 shown in FIG. 9 is that a label is directly attached to the robotic arm in the FIG. 9 embodiment whereas an item having a label thereon is attached to the robotic arm in the FIG. 6 embodiment.

The flow diagram 1500 may be implemented by a computing device such as the second controller 610 of FIG. 3B. For the purpose of the convenience, the description will be made based on the second controller 610 of FIG. 3B performing the flow diagram 1500. Again, the main difference between the flow diagram 1100 of FIG. 6 and the flow diagram 1500 of FIG. 9 is that a data building operation is described in FIG. 9 with reference to a label 1030 directly attached to the robotic arm 632 whereas a data building operation is described in FIG. 6 with reference to an item having a label thereon being attached to the robotic arm 632. Before the flow diagram 1500 is performed, a label 1030 may be attached to the robotic arm 632 (see, e.g., FIG. 3B). The robotic arm 632 may have an attachment mechanism and/or an indexing features thereon which receives corresponding or complementary mechanisms or indexing features. For example, the robotic arm 632 may have a magnetic portion and tabs or pins in a certain arrangement, and the label 1030 is on a ferrous or other magnetic material that has corresponding or complementary tabs and pins to properly align the label 1030 with the robotic arm 632. The flow diagram 1500 will be described with respect to FIG. 3B.

In state 1510, the second controller 610 may control at least one of the optical scanner 640 and the robotic arm 632 to at least partially align the lens of the optical scanner 640 with the label 1030 attached to the robotic arm 632.

The label 1030 may be made of a variety of materials such as paper, wood, plastic, metal, polymer, rubber, glass, aluminum, alloy, magnetic material, or a combination thereof, etc. In some embodiments, the label 1030 may be directly attached to the rotating mechanism 634. In other embodiments, a plate (not shown) may be attached to the rotating mechanism 634 and the label 1030 may be attached to the plate, for example, via an adhesive. The plate may be made of a magnetic material and be directly attached to the rotating mechanism 634 without an adhesive. In some embodiments, the labels may include, but are not limited to, warning labels, DOT hazard labels, or service indicator labels as described above.

In some embodiments, the second controller 610 may move the optical scanner 640 to at least partially align the lens of the optical scanner 640 with the label 1030 attached to the robotic arm 632 in other embodiments, the second controller 610 may also move the robotic arm 632 to at least partially align the lens of the optical scanner 640 with the label 1030. In other embodiments, the second controller 610 may also move both the optical scanner 640 and the robotic arm 632 to at least partially align the lens of the optical scanner 640 with the label 1030. For the purpose of convenience, an optical scanner drive device is not shown in FIG. 3B.

In state 1320, the second controller 610 may control the optical scanner 640 to capture the label 1030 at a first position and in a first capturing environment. The first position may be an initial position of the label 1030 which is at least partially aligned with the lens of the optical scanner 640. The position may also include one or more of angles or distances between the lens of the optical scanner 640 and the label 1030, orientations of the label 1030 with respect to the lens of the optical scanner 640. The first capturing environment may include, but is not limited to, robotic arm or item movement speeds, optical scanner settings such as optical scanner shutter speeds, focus, intensity, color, white balance, lightings, shadows, contrasts, lighting conditions, or combinations thereof.

In state 1330, the second controller 610 may control the optical scanner 640 to store a first captured image of the label 1030, taken at the first position and in the first capturing environment, in the database 620. The second controller 610 also stores the known identity and/or details of the label 1030 in view of the optical scanner 640 when the first image of the label 1030 is captured.

In state 1540, the second controller 610 may control the robotic arm 632 to move the label 1030 to a second position and a second capturing environment.

In state 1550, the second controller 610 may control the optical scanner 640 to store the second captured image of the label 1030, taken at the second position and in the second capturing environment, in the database 620.

In state 1560, the second controller 610 may control the optical scanner 640 to capture the label 1030 at an nth position and in an nth capturing environment. Although not shown in FIG. 9, between states 1550 and 1560, the second controller 610 may control the robotic arm 632 to move the label 1030 to an nth position and an nth capturing environment.

The nth position of the label 1030 may be the same as or different from any of the first to (n−1)th positions of the label 1030. The nth capturing environment of the label 1030 may be the same as or different from any of the first to (n−1)th capturing environments of the label 1030. The combination of the first position and the first capturing environment may be different from the combination of the nth position and the nth capturing environment as described with respect to FIG. 6.

In state 1570, the second controller 610 may control the optical scanner 640 to store the nth captured image of the label 1030, taken at the nth position and in the nth capturing environment, in the database 620.

In state 1580, the second controller 610 may control the database 620 to move some of the data sets stored therein to the training data DB 485 and the remaining data sets stored therein to the test data DB 495 as described above with respect to FIG. 6.

Figure 10:
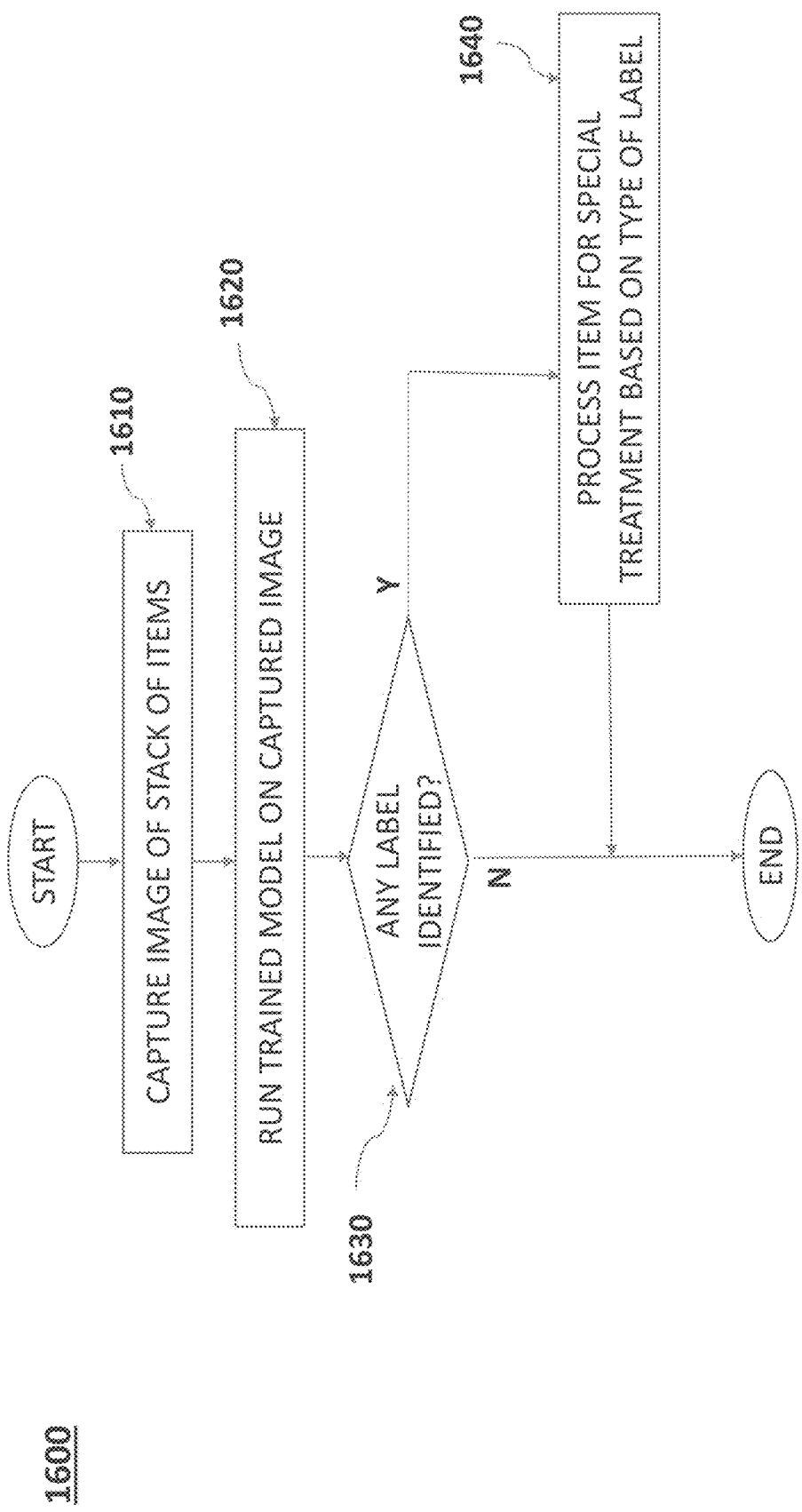
FIG. 10 is an example flow diagram illustrating an exemplary method for automatically recognizing labels on item by running the trained machine learning or deep learning model according to some embodiments.

FIG. 10 is a flow diagram of an exemplary process 1600 for automatically recognizing labels on item by running the trained machine learning or deep learning model according to some embodiments. The flow diagram 1600 may be implemented by a computing device such as the first controller 480 of FIG. 2. For the purpose of the convenience, the description will be made based on the first controller 480 of FIG. 2 performing the flow diagram 1600. The flow diagram 1600 will be described with respect to FIG. 2.

In state 1610, the optical scanner 420 may capture an image of, for example, a stack of items 110-160 shown in FIG. 2. Again, the configuration/arrangement of the items 110-160 shown in FIG. 2 are merely examples, and other configurations/arrangements are also possible.

In state 1620, the first controller 480 may run a trained model on the captured image. As described above, the trained model may be stored in one or more of the model DB 475, the first controller 480 or the memory 490.

In state 1630, the first controller 480 may determine whether the captured image identifies any label on one of the items 110-160. As discussed above, the label may include a warning label, a hazardous label, a service indicator label, or a label for special treatment, etc. If it is determined in state 1630 that the captured image identifies any label on one of the items 110-160, the item having the identified label may be processed for special treatment (state 1640). For example, the item may be manually moved or automatically moved by a robotic arm or other moving mechanism for special treatment. The special treatment may be based on the type of label. For example, if the identified label is a warning label or a hazardous label, the item having the identified label may be handled with extra caution. The first controller 480 may store the status of the item having the identified label. As another example, if the identified label indicates a higher serviced class such as a first class or priority mail, the item may be handled accordingly. The first controller 480 may store the status of the item requiring special treatment. In some embodiments, the information about the identified labels may be stored on the memory 490 in connection with the corresponding item information for future reference or use in another item processing facility. If it is determined in state 1630 that the captured image does not identify any label on one of the items 110-160, the procedure 1600 may end.

Figure 11:
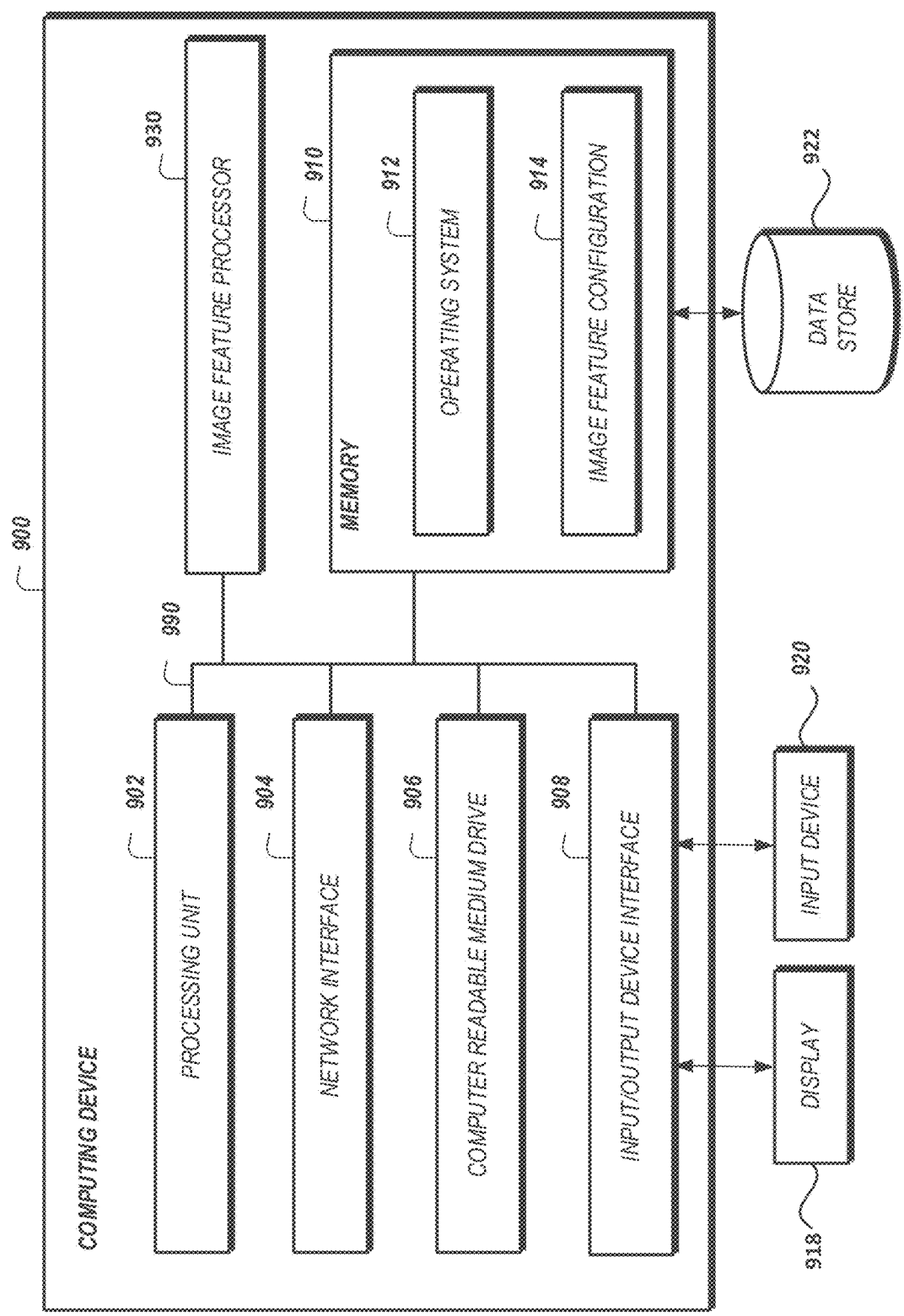
FIG. 11 is a block diagram of an embodiment of a computing device for building machine learning or deep learning data sets, for training a machine learning or deep learning model with the built data sets, or for automatically recognizing labels on items using the trained model, according to some embodiments.

FIG. 11 is an example block diagram of a computing device 900 for building machine learning or deep learning data sets, for training a machine learning or deep learning model with the built data sets, or for automatically recognizing labels on items using the trained model, according to some embodiments. FIG. 11 is merely an example block diagram of the computing device 900, and certain elements may be removed, other elements added, two or more elements combined or one element can be separated into multiple elements depending on the specification and requirements.

The computing device 900 can be a server or other computing device, and can include a processing unit or processor 902, an image feature processor 930, a network interface 904, a computer readable medium drive 906, an input/output device interface 908, and a memory 910. The computing device 900 may implement the features of one or more of the optical scanners 420/640, the first controller 480, or the second controller 610.

The network interface 904 can provide connectivity to one or more networks or computing systems. The network interface 904 can receive information and instructions from other computing systems or services via the network interface 904. The network interface 904 can also store data directly to memory 910. The processing unit 902 can communicate to and from memory 910 and output information to an optional display 918 via the input/output device interface 908. The input/output device interface 908 can also accept input from the optional input device 920, such as a keyboard, mouse, digital pen, microphone, mass storage device, etc.

The memory 910 may contain computer program instructions that the processing unit 902 executes in order to implement one or more embodiments. The memory 910 generally includes RAM. ROM, and/or other persistent, non-transitory computer readable media. The memory 910 can store an operating system 912 that provides computer program instructions for use by the processing unit 902 or other elements included in the computing device in the general administration and operation of the computing device 900. The memory 910 can further include computer program instructions and other information for implementing aspects of the present disclosure.

For example, in one embodiment, the memory 910 includes an image feature configuration 914. The image feature configuration 914 may include one or more desired orientations for displaying different types of items, regular expressions for sets of characters including the routing information (e.g., ZIP code), area(s) of pre-printed packaging material that may include address information or other routing information, or other information supporting the image based routing of items described herein. The image feature configuration 914 may store specific values for a given configuration. The image feature configuration 914 may, in some embodiments, store information for obtaining values for a given configuration. For example, an address information extraction service implementing the regular expressions for identifying the address information or identify destination location information extracted from an image may be specified as a network location (e.g., URL) in conjunction with username and password information to access the service. In such embodiments, a message including the extracted text (or portion thereof) may be provided to the service. A response message may include the extracted address or destination location information, if available.

The memory 910 may also include or communicate with one or more auxiliary data stores, such as data store 922. The data store 922 may electronically store data regarding mail pieces, image files, or finalization results therefore.

The elements included in the computing device 900 may be coupled by a bus 990. The bus 990 may be a data bus, communication bus, or other bus mechanism to enable the various components of the computing device 900 to exchange information.

In some embodiments, the computing device 900 may include additional or fewer components than are shown in FIG. 11. For example, a computing device 904 may include more than one processing unit 902 and computer readable medium drive 906. In another example, the computing device 900 may not be coupled to a display 918 or an input device 920. In some embodiments, two or more computing devices 900 may together form a computer system for executing features of the present disclosure.

In some embodiments, a non-transitory computer readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X. Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for building machine learning or deep learning data sets for automatically recognizing information on items, the system comprising:
   an optical scanner configured to capture an item including one or more pieces of information provided thereon, the item captured a plurality of times at different positions with respect to the optical scanner;
   a robotic arm on which the item is deposed, the robotic arm configured to rotate the item horizontally and/or vertically such that the one or more pieces of the information of the item are captured by the optical sensor at the different positions with respect to the optical scanner; and
   a database configured to store the captured images of the one or more pieces of information of the item;
   wherein the stain comprises stain relationships between the different positions of the one or more pieces of the information of the item and whether the captured one or more pieces of the information of the item we tub recognized by the optical scanner.

2. The system of claim 1, wherein the item comprises a mail item, and wherein the one or more pieces of the information comprise an address section, a sender section, a recipient section, a barcode section, a postage section, a special item section and a label.

3. The system of claim 2, wherein the label comprises a service class indicator label, a warning label or a hazardous label.

4. The system of claim 3, wherein the hazardous label comprises a department of transportation (DOT) hazard class label.

5. The system of claim 1, wherein the controller is further configured to move at least one of the optical scanner and the robotic arm to at least partially align a lens of the optical scanner with the item disposed on the robotic arm.

6. The system of claim 1, further comprising a light source configured to emit light to the one or more pieces of information provided on the item.

7. The system of claim 6, wherein the controller is further configured to control one or more of the optical scanner, the robotic arm and the light source such that the one or more pieces of information provided on the item are captured by the optical scanner in different capturing environments.

8. The system of claim 7, wherein the different capturing environments comprise one or more of robotic arm or item movement speeds, optical scanner shutter speeds, focus, intensity, color, white balance, lightings, shadows, contrasts, lighting conditions, or combinations thereof.

9. The system of claim 1, wherein the positions comprise one or more of angles or distances between a lens of the optical scanner and the item, or orientations of the item with respect to the lens of the optical scanner.

10. The system of claim 1, further comprising:
    a plate to which the item is attached; and
    rotation mechanism provided on the robotic arm and configured to rotate the plate.

11. A method of building machine learning or deep learning data sets for automatically recognizing information on items, the method comprising:
    capturing, at an optical scanner, an item inducing one or more pieces of information provided thereon, the item captured a plurality of times at different positions with respect to the optical scanner;
    rotating the item, via a robotic arm on which the item is deposed, horizontally and/or vertically such that the one or more pieces of the information of the item are captured by the optical scanner at the different positions with respect to the optical scanner; and
    storing, at a database, the captured images of the one or more pieces of information of the item;
    wherein the stain comprises stain relationships between the different positions of the one or more pieces of the information of the item and whether the captured one or more pieces of the information of the item are tub recognized by the optical scanner.

12. The method of claim 11, wherein the item comprises a mail item, and wherein the one or more pieces of the information comprise an address section, a sender section, a recipient section, a barcode section, a postage section, a special item section, and a label.

13. The method of claim 12, wherein the label comprises a warning label, a department of transportation (DOT) hazard class label or a service classification indicator label.

14. The method of claim 11, further comprising controlling, at a controller, the database to move a first portion of the captured images stored in the database to a training data DB and a second portion of the captured images stored in the database different from the first portion to a test data DB, the controller configured to train a machine learning or deep learning model for automatically recognizing labels on items with the first portion of the captured images stored in the training data DB, and test the trained machine learning or deep learning model with the second portion of the captured images stored in the test data DB.

15. The method of claim 14, wherein the controlling comprises moving at least one of the optical scanner and the robotic arm to at least partially align a lens of the optical scanner with the item disposed on the robotic arm.

16. The method of claim 11, further comprising emitting, at a light source, light to the one or more pieces of the information of the item.

17. The method of claim 16, further comprising controlling, at the controller, one or more of the optical scanner, the robotic arm and the light source such that the one or more pieces of the information of the item are captured by the optical scanner in different capturing environments.

18. The method of claim 17, wherein the different capturing environments comprise robotic arm or item movement speeds, optical scanner shutter speeds, focus, intensity, color, white balance, lightings, shadows, contrasts, lighting conditions or combinations thereof.

19. The method of claim 11, wherein the positions comprise one or more of angles or distances between a lens of the optical scanner and the one or more pieces of the information of the item, orientations of the one or more pieces of the information of the item with respect to the lens of the optical scanner.

* * * * *